US012676440B2

(12) United States Patent
Yun et al.

(10) Patent No.: US 12,676,440 B2
(45) Date of Patent: Jul. 7, 2026

(54) CONNECTOR INCLUDING CONTACT POINT STRUCTURE

(71) Applicant: Samsung Electronics Co., Ltd., Suwon-si (KR)

(72) Inventors: Heekang Yun, Suwon-si (KR); Hanseok Mun, Suwon-si (KR); Inha Lee, Suwon-si (KR); Kyungho Lee, Suwon-si (KR); Jaeryong Han, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 466 days.

(21) Appl. No.: 18/336,272

(22) Filed: Jun. 16, 2023

(65) Prior Publication Data

US 2023/0327357 A1 Oct. 12, 2023

Related U.S. Application Data

(63) Continuation of application No. PCT/KR2021/018813, filed on Dec. 10, 2021.

(30) Foreign Application Priority Data

Dec. 17, 2020 (KR) ........................ 10-2020-0177724

(51) Int. Cl.
*H01R 12/71* (2011.01)
*H01R 12/57* (2011.01)
(Continued)

(52) U.S. Cl.
CPC ......... *H01R 13/2407* (2013.01); *H01R 12/57* (2013.01); *H01R 12/58* (2013.01);
(Continued)

(58) Field of Classification Search
CPC .... H01R 13/2407; H01R 12/57; H01R 12/58; H01R 12/7011; H01R 12/716; H01R 13/64; H01R 13/2442
See application file for complete search history.

(56) References Cited

U.S. PATENT DOCUMENTS 5,836,773 A * 11/1998 McHugh ............. H01R 12/716
439/74
6,071,129 A * 6/2000 Konno ................ H01R 12/716
439/74
(Continued)

FOREIGN PATENT DOCUMENTS

JP 2606117 B2 2/1997
JP 4472762 B2 3/2010
(Continued)

OTHER PUBLICATIONS

Korean Office Action for Korean Patent Application No. 10-2020-0177724 dated Jan. 6, 2025.
(Continued)

*Primary Examiner* — Abdullah A Riyami
*Assistant Examiner* — Nelson R. Burgos-Guntin
(74) *Attorney, Agent, or Firm* — CANTOR COLBURN LLP

(57) ABSTRACT

A connector according to various embodiments of the present disclosure comprises: a housing; an accommodation groove formed in one portion of the connector; a guide comprising a first guide firmed on the side surface of the accommodation groove and a second guide formed on the side surface of the accommodation groove to be spaced a certain distance from the first guide; and a first contact arranged between the first guide and the second guide, wherein the first contact comprises a first bending portion and a second bending portion. The guide is in contact with a header and guides the position of the header. A first point
(Continued)

of the first bending portion is in contact with the header, and as the first bending portion is bent, the first bending portion applies the pressure to the header so that the header is fixed to the connector. A second point of the first bending portion may be in contact with a third point of the second bending portion. Other various embodiments are possible.

20 Claims, 19 Drawing Sheets

(51) Int. Cl.

| | |
|---|---|
| ***H01R 12/58*** | (2011.01) |
| ***H01R 12/70*** | (2011.01) |
| ***H01R 13/24*** | (2006.01) |
| ***H01R 13/64*** | (2006.01) |

(52) U.S. Cl.

CPC ....... *H01R 12/7011* (2013.01); *H01R 12/716* (2013.01); *H01R 13/64* (2013.01)

(56) References Cited

U.S. PATENT DOCUMENTS

| | | | | |
|---|---|---|---|---|
| 6,729,890 | B2 * | 5/2004 | Shin | H01R 13/26 439/74 |
| 9,153,892 | B2 | 10/2015 | Tanaka et al. | |
| 9,252,517 | B2 * | 2/2016 | Kimura | H01R 12/85 |
| 2007/0264854 | A1 | 11/2007 | Sasaki | |
| 2010/0291776 | A1 * | 11/2010 | Huang | H01R 13/2457 439/74 |
| 2013/0295784 | A1 * | 11/2013 | Hasegawa | H01R 12/73 439/55 |
| 2014/0377999 | A1 * | 12/2014 | Miyazaki | H01R 12/707 439/626 |
| 2014/0378007 | A1 * | 12/2014 | Miyazaki | H01R 12/716 439/816 |
| 2016/0190719 | A1 | 6/2016 | Brzezinski et al. | |
| 2016/0238651 | A1 | 8/2016 | An et al. | |
| 2017/0365944 | A1 | 12/2017 | Yoshioka et al. | |
| 2018/0316107 | A1 * | 11/2018 | Yoshioka | H01R 12/7082 |
| 2020/0006874 | A1 | 1/2020 | Ueda | |
| 2020/0112118 | A1 * | 4/2020 | Obata | H01R 12/91 |

FOREIGN PATENT DOCUMENTS

| | | | |
|---|---|---|---|
| JP | 2012164528 | A | 8/2012 |
| JP | 5945766 | B2 | 6/2016 |
| JP | 2018152190 | A | 9/2018 |
| JP | 6628685 | B2 | 12/2019 |
| KR | 1020060117836 | A1 | 11/2006 |
| KR | 1020080063955 | A | 7/2008 |
| KR | 100852713 | B1 | 8/2008 |
| KR | 1020160101603 | A | 8/2016 |
| KR | 1020170033323 | A | 3/2017 |
| KR | 101766198 | B1 | 8/2017 |
| WO | 2020150075 | A1 | 7/2020 |

OTHER PUBLICATIONS

Korean Notice of Patent Grant for Korean Patent Application No. 10-2020-0177724 dated Jul. 16, 2025.

* cited by examiner

CONNECTOR INCLUDING CONTACT POINT STRUCTURE

CROSS-REFERENCE TO RELATED APPLICATIONS

This application is a continuation application of International Application No. PCT/KR2021/018813 designating the United States, filed on Dec. 10, 2021, at the Korean Intellectual Property Receiving Office and claiming priority to Korean Patent Application No. 10-2020-0177724, filed on Dec. 17, 2020, at the Korean Intellectual Property Office, the disclosures of which are incorporated by reference herein in their entireties.

BACKGROUND

1) Field

Various embodiments of the disclosure relate to a connector including a contact point structure.

2) Description of the Related Art

With the development of digital technology, electronic devices are being provided in various forms like smartphones, tablet personal computers (PCs), wearable electronic devices. Electronic devices are being miniaturized to enhance portability and accessibilities of users.

An electronic device may include a board-to-board (btob) connector to electrically connect a plurality of printed circuit boards to each other, within the electronic device. As electronic devices are miniaturized, a plurality of printed circuit boards having components mounted thereon are also miniaturized. Accordingly, the designs of components mounted on printed circuit boards are getting smaller and btob connectors are also miniaturized.

SUMMARY

A contact structure of a btob connector may have two or more contact points in order to achieve contact stability. If the contact structures of the two-contact point structure are arranged in one row, the number of contact structures for transmitting and receiving signals may increase, and accordingly, an overall length of the btob connector may increase. On the other hand, if the contact structures of the two-contact point structure are arranged in two rows, an overall width of the connector may increase to ensure a space between the contact structures.

Various embodiments of the disclosure may implement a contact structure having a one-contact point structure and may miniaturize a connector by guaranteeing a minimum space between the contact structures.

According to various embodiments of the disclosure, a connector may include a housing forming an exterior of the connector, an accommodation groove formed on a part of the connector and including a side surface and a bottom surface, a header being drawn in or out from the accommodation groove, a guide structure including a first guide which is formed on a side surface of the accommodation groove, and a second guide which is formed on the side surface of the accommodation groove at a designated distance from the first guide, and a first contact structure penetrating through the connector to be disposed between the first guide and the second guide, and the first contact structure may include a first bending portion and a second bending portion, and, as the first header is drawn in the accommodation groove, the guide structure may come into contact with the header to guide a position of the first header, and a first point of the first bending portion may come into contact with the first header, and, as the first bending portion is bended, the first bending portion may apply a pressure to the header in a first direction to fix the first header to the connector, and a second point of the first bending portion may come into contact with a third point of the second bending portion.

According to various embodiments of the disclosure, a connector may include a housing forming an exterior of the connector, an accommodation groove formed on a part of the connector and including a side surface and a bottom surface, a header being drawn in or out from the accommodation groove, a guide structure including a first guide which is formed on a side surface of the accommodation groove, and a second guide which is formed on the side surface of the accommodation groove at a designated distance from the first guide, and a first contact structure including a first portion buried in the molding and a second portion protruding from the side surface of the accommodation groove, and the housing may include a molding forming the accommodation groove, and, as the header is drawn in the accommodation groove, the guide structure may come into contact with the header to guide a position of the header, and the first contact structure may come into contact with the header at one point and may apply a pressure to the header in a first direction to fix the header to the connector.

According to various embodiments of the disclosure, the connector includes a contact structure having a one-contact point structure. Through this, a space between the contact structures facing each other may be minimized and the connector may be miniaturized.

In addition, according to various embodiments, the contact structure may include a bending portion. As the header is drawn in the connector, the bending portion may be bent and may apply a pressure to the header, and accordingly, contact stability may be guaranteed.

In addition, according to various embodiments, as the header is drawn in the connector, one point of the first bending portion of the contact structure may come into contact with one point of the second bending portion, and accordingly, the connector may guarantee a short electrical path.

In addition, according to various embodiments, as the header is drawn in the connector, the guide structure of the connector may come into contact with the header and may prevent the header from being further drawn in the accommodation groove, and may prevent plastic deformation of the contact structure caused by the header drawn in further.

In addition, according to various embodiments, the connector has different contact points of the contact structures disposed adjacent to each other, so that a damage of the contact structure by a fire caused by mis-alignment of the header may be prevented.

In addition, various effects that may be directly or indirectly understood through the disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, various embodiments of the disclosure will be described with reference to the accompanying drawings. However, these are not intended to limit the disclosure to a specific embodiment and should be understood as including various modifications, equivalents, or alternatives of embodiments of the disclosure.

Figure 1A:
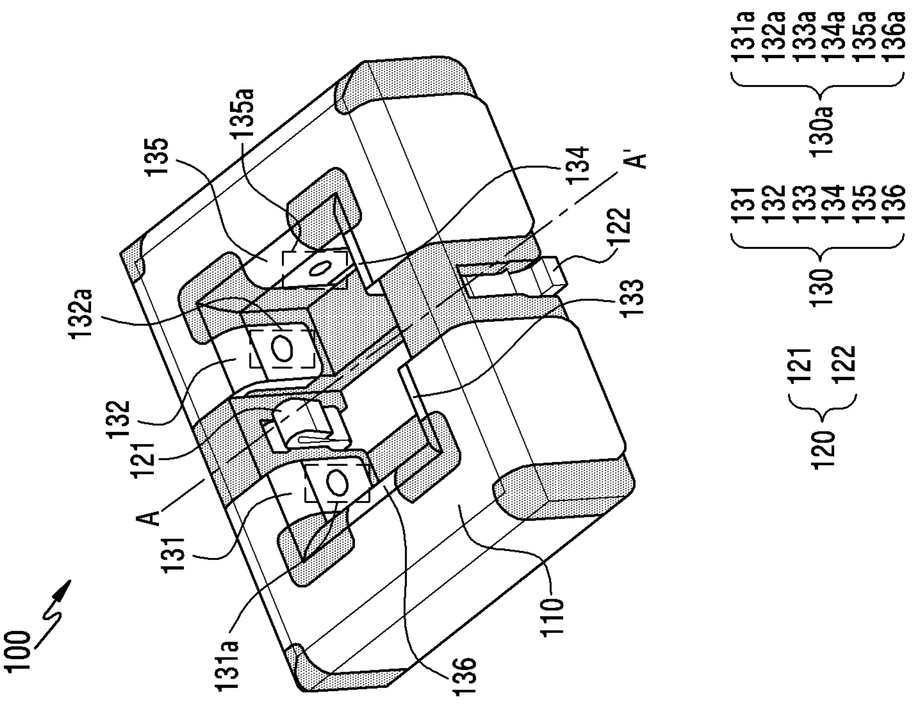
FIGS. 1A and 1B are respectively a perspective view and a top plan view illustrating a connector including an accommodation groove and a contact structure according to an embodiment.
Figure 1B:
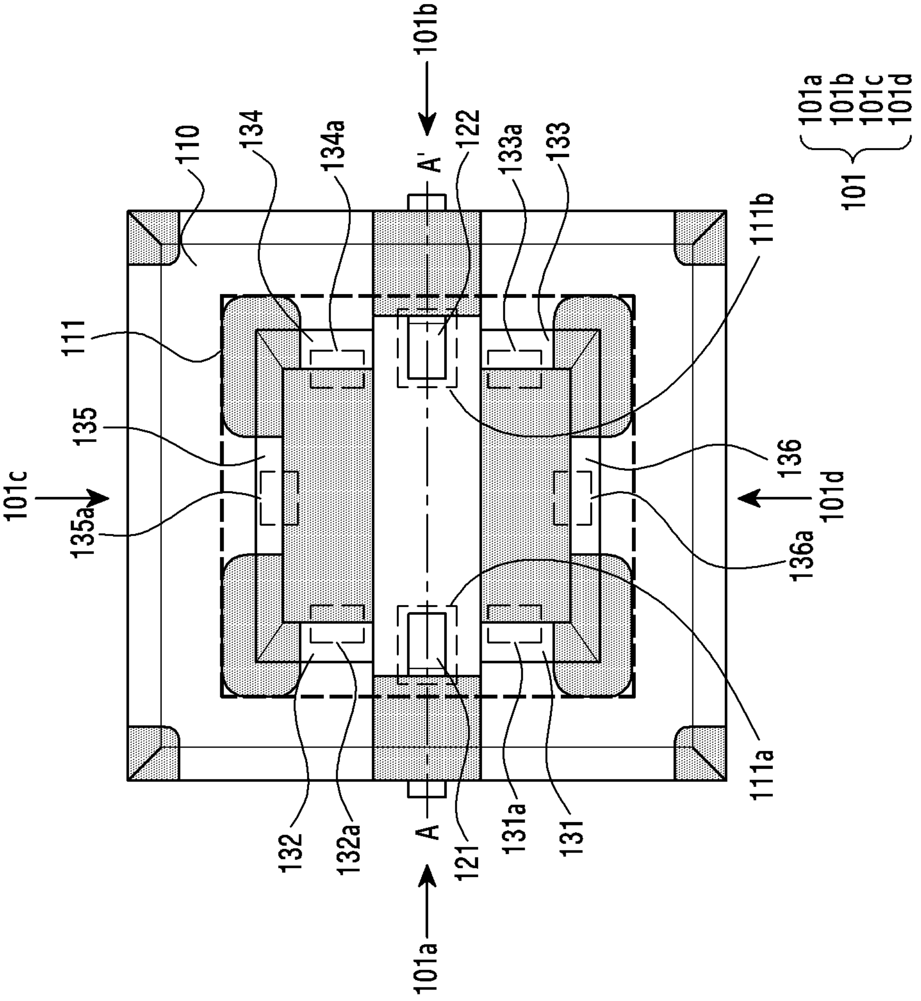

FIGS. 1A and 1B are respectively a perspective view and a top plan view illustrating a connector including an accommodation groove and a contact structure.

Figure 1C:
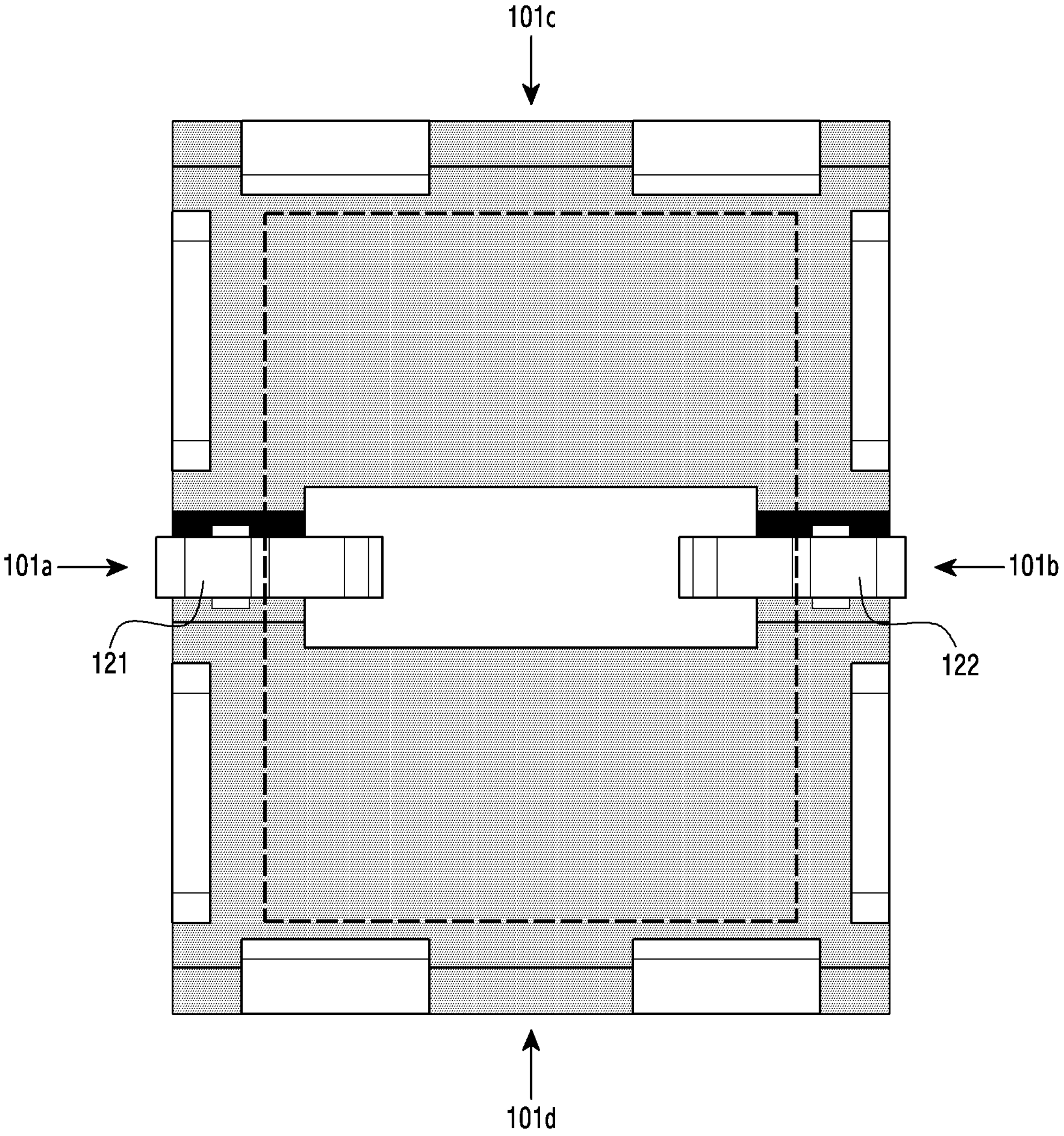
FIG. 1C is a top plan view illustrating an interior structure of the connector.

FIG. 1C is a top plan view illustrating an interior structure of the connector.

Figure 1D:
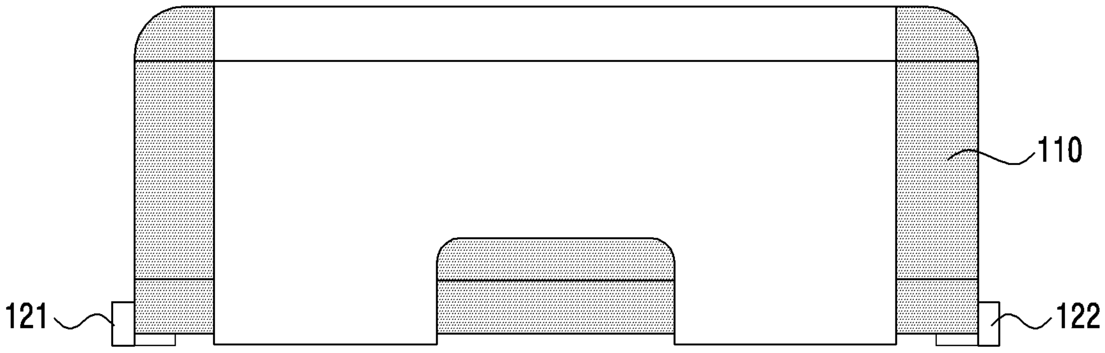
FIG. 1D is a cross-sectional view illustrating the connector as viewed from a fourth outer surface.

FIG. 1D is a cross-sectional view illustrating the connector as viewed from a fourth outer surface.

Figure 1E:
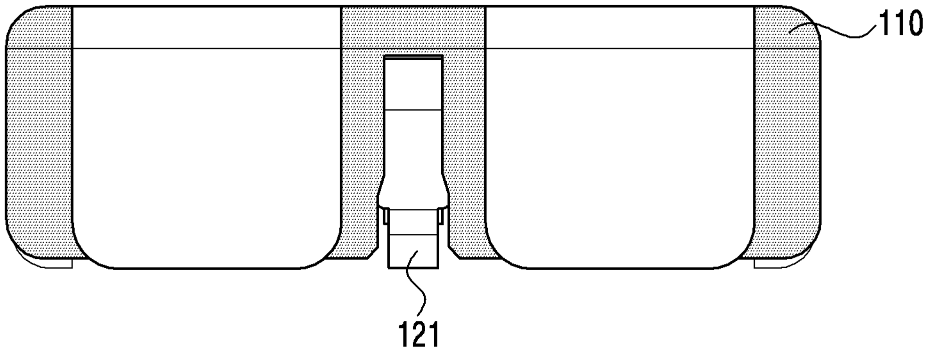
FIG. 1E is a cross-sectional view illustrating the connector as viewed from a first outer surface.

FIG. 1E is a cross-sectional view illustrating the connector as viewed from a first outer surface.

Referring to FIGS. 1A and 1B, the connector 100 according to an embodiment may include a housing 110, a contact structure 120, and a guide structure 130. In an embodiment, the contact structure 120 may include a first contact structure 121 and/or a second contact structure 122. In an embodiment, the guide structure 130 may include a first guide 131, a second guide 132, a third guide 133, a fourth guide 134, a fifth guide 135, and/or a sixth guide 136.

According to an embodiment, the connector 100 may include or define a groove such as a first accommodation groove 111 through which a header is drawn into or out of the connector 100. In an embodiment, the first accommodation groove 111 may have a concave shape. In the disclosure, a flat surface of a lower end of the first accommodation groove 111 may be referred to as a bottom surface of the connector 100, and a surface that extends from the bottom surface toward an entrance of the first accommodation groove 111 may be referred to as a side surface of the connector 100. One or more portion of the housing 110 may defined the first accommodation groove 111.

However, the shape of the first accommodation groove 111 is not limited to the concave shape shown in FIG. 1A, and may have various shapes to allow the header to be drawn into or out of the connector 100. For example, the first accommodation groove 111 may be formed or provided by one (single) curved surface from the lower end to the upper end at the entrance, without distinguishing between a side surface and a bottom surface.

In an embodiment, one surface of the connector 100 at which the first accommodation groove 111 is formed (e.g., from which the first accommodation groove 111 is recessed) may be referred to as a front surface of the connector 100, and a surface that is in opposite direction of the front surface such as to face the front surface may be formed as a rear surface of the connector 100. A surface that encloses a space between the front surface and the rear surface may be formed as an outer surface 101 of the connector 100. In an embodiment, the outer surface 101 of the connector 100 may include a first outer surface 101*a*, a second outer surface 101*b*, a third outer surface 101*c*, and a fourth outer surface 101*d* as respectively outer side surfaces which form an outer surface of the connector 100.

According to an embodiment, the housing 110 may form a part of the front surface of the connector 100, the rear surface, and the outer surface 101.

According to an embodiment, the first contact structure 121 and the second contact structure 122 may be disposed by penetrating through the connector 100. For example, the connector 100 may include (or define) a first hole for the first contact structure 121 that extends from one point of the first outer surface 101*a*, through a portion of the housing 110, to one point of the first accommodation groove 111, such as to be open at both the outer surface and the inner surface (e.g., the surface which defines the first accommodation groove 111). For example, the connector 100 may define a second hole for the second contact structure 122 which extends from one point of the second outer surface 101*b*, through the housing 110, to one point of the inner side surface defining the first accommodation groove 111. That is, a sidewall of the housing 110 defines a hole in the sidewall, the hole extending along the first direction and being open at both the groove and to outside of the connector 100.

the contact extends through the hole to penetrate the sidewall of the housing

According to an embodiment, the first contact structure 121 and the second contact structure 122 may be disposed at positions opposite to each other, along a planar direction of the connector 100. For example, the first contact structure 121 may be disposed at a first portion 111*a* of a side surface of the first accommodation groove 111, and the second contact structure 122 may be disposed at a second portion 111*b* of a side surface of the first accommodation groove 111, which is a position opposite to the first contact structure 121.

According to an embodiment, the first guide 131 and the second guide 132 may both be disposed on a same side surface of the first accommodation groove 111 with the first contact structure 121 being disposed therebetween in a direction along a lateral portion of the housing 110 (e.g., a lateral direction). For example, at a same side of the housing 110, the inner side surface of the housing 110 defining a recess which is open to the groove, in the first direction, together with a first guide 131 and a second guide 132 of the housing 110 respectively on opposing sides of the recess along the same side of the housing 110. The contact protrudes from the inner side surface, which is at the recess, as shown in FIG. 1A.

In an embodiment, the third guide 133 and the fourth guide 134 may both be disposed on a same side surface of the first accommodation groove 111 with the second contact structure 122 being disposed therebetween along the lateral direction. The fifth guide 135 may be disposed on one side surface of the first accommodation groove 111 that is parallel to the third outer surface 101*c*, and the sixth guide 136 may be disposed on one side surface of the first accommodation groove 111 that is parallel to the fourth outer surface 101*d*. Surfaces 132, 135 and 134 may together define a first guide surface of the guide structure 130, while surfaces 131, 136 and 133 may together define a second guide surface of the guide structure 130. The various surfaces may be inclined with respect to an upper surface of the housing 110 and the inner side surfaces of the housing 110 which define the first accommodation groove 111. That is, the guides may be considered an upper portion of the sidewall of the housing 110, where the upper portion may include a curved surface, an inclined surface, etc., without being limited thereto.

According to an embodiment, when the header is drawn in or inserted into the first accommodation groove 111, the guide structure 130 may come into contact with the header and may guide the position of the header from an outside of the housing 110 to an inside of the housing 110.

According to an embodiment, the guide structure 130 may guide the position of the header, thereby preventing the contact structure 120 from undergoing plastic deformation. For example, when the header is drawn in the first accommodation groove 111, the header and the first accommodation groove 111 may be misaligned. In this case, the first guide 131 and the second guide 132 at a same side of the connector 100 may come into contact with the header, such that the header may be prevented from being drawn in further than when the header is normally drawn in if there is no misalignment, and plastic deformation of the first contact structure 121 caused by the header further drawn in may be prevented. In an embodiment, the guide structure 130 may be formed with a conductive material and may correspond to a power terminal in the connector 100.

According to an embodiment, at the first accommodation groove 111, the guide structure 130 may include an embo (or, embossment, embossed portion) 130*a*. For example, the first guide 131 may include a first embo (or, first embossment, first embossed portion) 131*a* formed on (or at) one portion thereof, and the second guide 132 may include a second embo 132*a* formed on one portion thereof. In another example, the third guide 133 may include a third embo 133*a* formed on one portion thereof, and the fourth guide 134 may include a fourth embo 134*a* formed on one portion thereof. The fifth guide 135 may include a fifth embo 135*a* formed on one portion thereof and the sixth guide 136 may include a sixth embo 136*a* formed on one portion thereof. In an embodiment, when the header is drawn in, the embo 130*a* may come into contact with the header and may prevent the header from being misaligned or being released, through a friction with the header when a physical force is applied from the outside or there is a shake. One or more of the embo may apply a frictional force or provide an interference fit to the header during insertion of the header into the first accommodation groove 111 and/or to the header which is inserted into (e.g., is fully inserted into) the first accommodation groove 111, to reduce or effectively prevent detachment or misalignment of the header due to an outside force. One or more of the embo may be exposed to the first accommodation groove 111 at an inner sidewall of the connector 100 which defines the first accommodation groove 111.

According to an embodiment, the contact structure 120 and/or the guide structure 130 may be formed (or provided) by press-fitting.

Referring to FIG. 1C, an interior structure of the connector 100 is illustrated. FIG. 1C illustrates structures of the first contact structure 121 and the second contact structure 122 in the connector 100. Referring to FIG. 1C, each of the first contact structure 121 and the second contact structure 122 is exposed to both the first accommodation groove 111 and to outside the connector 100. A respective contact structure (otherwise referred to as a connector contact or contact) may be exposed to the first accommodation groove 111 at a first end of the contact and to the outside of the housing 110 at a second end of the contact which is opposite to the first end of the contact.

Referring to FIG. 1D, an exterior shape of the connector 100 as viewed from the fourth outer surface 101*d* according to an embodiment is illustrated. FIG. 1D illustrates one end of the first contact structure 121 and one end of the second contact structure 122, and the one end of the first contact structure 121 and the one end of the second contact structure 122 may be electrically connected with a printed circuit board which is disposed outside the connector 100. That is, the outer ends of the first contact structure 121 and the second contact structure 122 are exposed to outside the connector 100 at the outer side surface. A bottom end of the first contact structure 121 and the second contact structure 122 may be exposed to outside the connector 100 at a rear surface thereof, together with be exposed at the outer side surface and the first accommodation groove 111.

Referring to FIG. 1E, an exterior shape of the connector 100 as viewed from the first outer surface 101*a* according to an embodiment is illustrated.

The shape of the connector illustrated in FIGS. 1A, 1B, 1C, 1D and 1E is an example of the connector 100 that may come into contact with the header, and the shape of the connector 100 is not limited to that illustrated in FIG. 1A.

Figure 2:
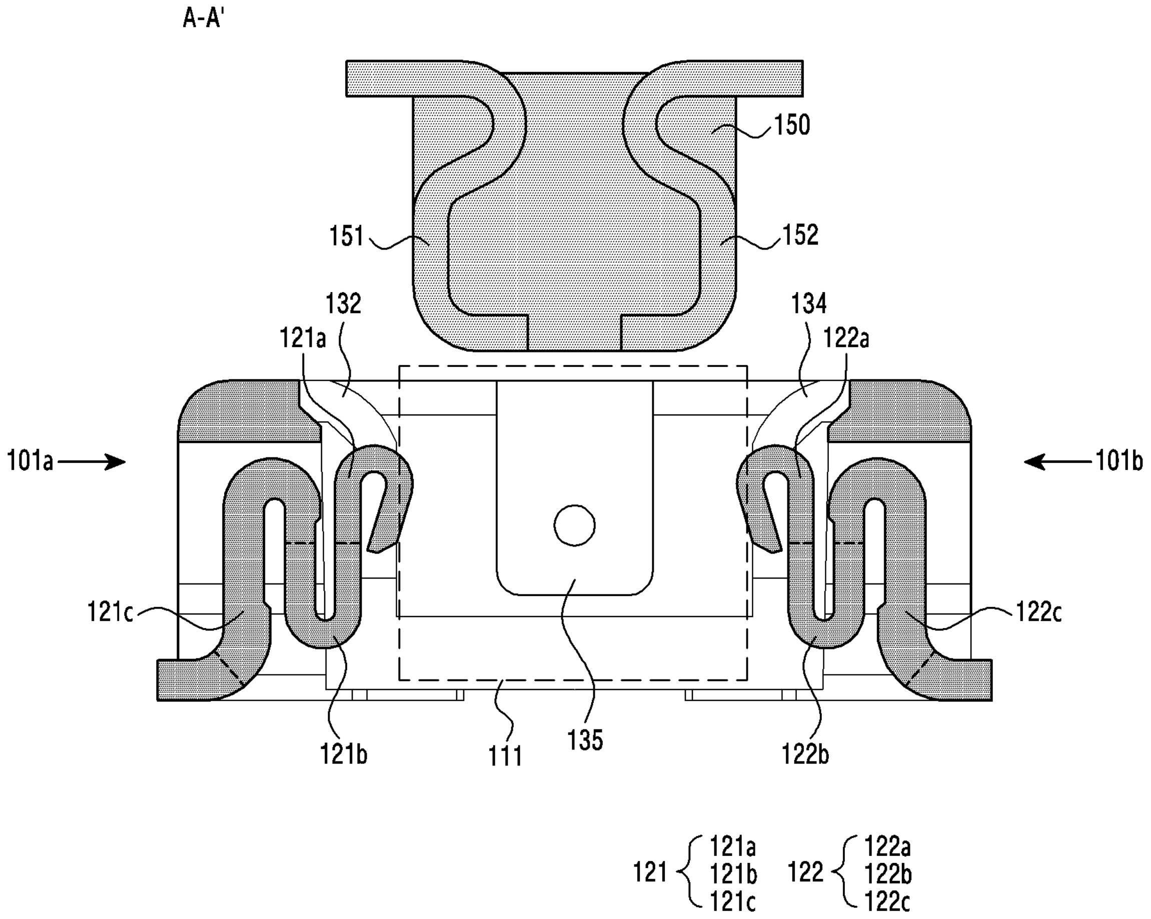
FIG. 2 is an exploded cross-sectional view taken along line A-A' in FIGS. 1A and 1B and illustrating the connector according to an embodiment.

FIG. 2 is a cross-sectional view taken on line A-A' and illustrating the connector 100 and the header of FIG. 1A.

Referring to FIG. 2, the first contact structure 121 according to an embodiment may include a first bending portion 121*a* (e.g., a first bent portion), a second bending portion 121*b* (e.g., a second bent portion) and/or a third bending portion 121*c* (e.g., a third bent portion). In an embodiment, the second contact structure 122 may include a fourth bending portion 122*a* (e.g., a fourth bent portion), a fifth bending portion 122*b* (e.g., a fifth bent portion) and/or a sixth bending portion 122*c* (e.g., a sixth bent portion). That is, in a direction from an inside of the connector 100 (e.g., at the first accommodation groove 111) to an outside of the connector 100, a respective contact may be bent once or more than once. A bent portion may be defined at a position where a direction of the contact changes, e.g., an inflection point or inflection location.

According to an embodiment, a first header 150 which is drawn in the first accommodation groove 111 may include a first signal terminal 151 and/or a second signal terminal 152 at opposing sides of the first header 150.

According to an embodiment, at the first contact structure 121 and the second contact structure 122, the connector 100 may be electrically connected with a first printed circuit board disposed outside the connector 100. The first header 150 may be electrically connected with a second printed circuit board which is disposed outside the connector 100. That is, the header may itself be a connector (e.g., a second connector) which is inserted into a first connector (e.g., the connector 100) for connecting two other components such as printed circuit boards, to each other. Accordingly, as the first header 150 is drawn in the first accommodation groove 111 of the connector 100, the first header 150 is electrically connected to the connector 100, and the first printed circuit board and the second printed circuit board may be electrically connected to each other.

In an embodiment, the second connector may be nested within the first connector to minimize a planar area of a connector structure (e.g., the first header 150 inserted into the connector 100). Each of the first and second connectors may include a contact or terminal which is exposed to outside thereof. In an embodiment, the second connector nested in and electrically connected to the first connector may define a connector structure including each of the first and second connectors including a contact or terminal which is exposed to outside the connector structure. The various connectors may be electrically connected to an outside component (e.g., a circuit board) at the exposed contact or the exposed terminal of the various connectors, without being limited thereto.

According to an embodiment, when the first header 150 is drawn in the first accommodation groove 111, the first contact structure 121 and/or the second contact structure 122 may come into electrical contact with the first header 150 to transmit and receive signals. For example, the first contact structure 121 may be used as a signal terminal (for example, TX1) to transmit a signal. The first signal terminal 151 (for example, RX1) of the first header 150 which corresponds to the first contact structure 121 may come into contact with the first contact structure 121 as the first header 150 is drawn in the first accommodation groove 111. For example, a first signal may be transmitted from the first printed circuit board which is connected with the first contact structure 121 to the second printed circuit board to which the first header 150 is connected. That is, the first header 150 which is inserted into the connector 100 includes an electrical connection between the first header 150 and the connector 100 and between the first circuit board and the second circuit board.

In another example, the second contact structure 122 may be used as a signal terminal (for example, TX2) to transmit a signal. The second signal terminal 152 (for example, RX2) of the first header 150 which corresponds to the second contact structure 122 may come into contact with the second contact structure 122 as the first header 150 is drawn in the first accommodation groove 111. For example, a second signal may be transmitted from the first printed circuit board which is connected with the second contact structure 121 to the second printed circuit board to which the first header 150 is connected.

In still another example, the first contact structure 121 may be electrically connected with a first ground of the first printed circuit board, and the first signal terminal 151 of the first header 150 corresponding to the first contact structure 121 may be electrically connected with a second ground of the second printed circuit board. For example, as the first header 150 is drawn in the first accommodation groove 111, the first ground and the second ground may be electrically connected with each other through the first contact structure 121 and the first signal terminal 151.

According to an embodiment, the bending portions 121*a*, 121*b*, 121*c*, 122*a*, 122*b* and 122*c* may include a bendable (or flexible) material. In an embodiment, the bending portion 121*a*, 121*b*, 121*c*, 122*a*, 122*b* and 122*c* may be bent or compressed along a planar direction within a designated range by insertion of the first header 150 into the first accommodation groove 111. In addition, the bending portions 121*a*, 121*b*, 121*c*, 122*a*, 122*b* and 122*c* may be unbent or uncompressed to be restored to an original state or shape by removal of the first header 150 from the first accommodation groove 111. Referring to FIG. 2, for example, the compression or expansion along the planar direction may be provided along a horizontal direction in FIG. 2 or in a direction between the first outer surface 101*a* and the second outer surface 101*b*.

Figure 3A:
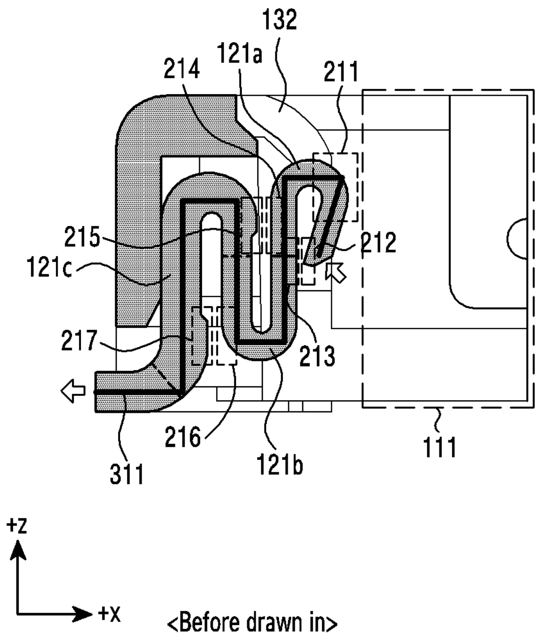
FIGS. 3A and 3B are cross-sectional views illustrating a first contact structure before and after a header is drawn in the connector according to an embodiment.
Figure 3B:
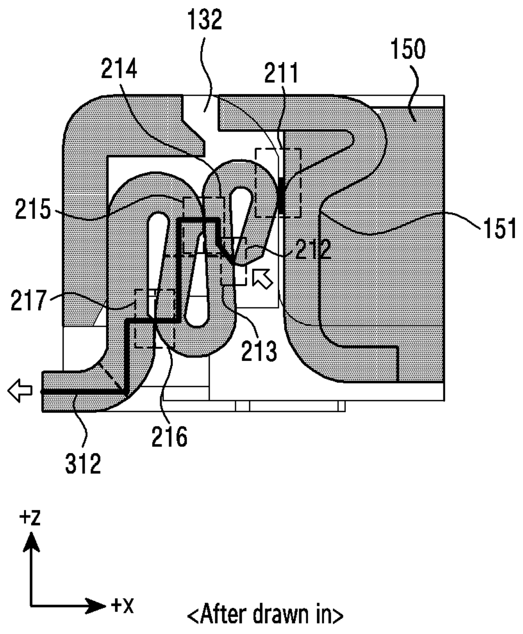

FIGS. 3A and 3B are cross-sectional views illustrating the first contact structure 121 before and after the header is drawn in the connector. It will be understood that the configurations of the first contact structure 121 and the header shown in FIGS. 3A and 3B can be equally applied to the second contact structure 122 relative to the header.

Referring to FIGS. 1A, 2 and 3, the first contact and the second contact may be opposite to each other along an x direction, respectively at opposing sides of the connector 100. Second opposing sides of the connector 100 may be opposite to each other along a y direction crossing the x direction. A plane may be defined by the x direction and the y direction crossing each other. A planar direction maybe defined along such plane. A thickness direction of the connector 100 or various components or layers thereof may be defined along a third direction, e.g., a z direction which crosses each of the x direction and the y direction.

Referring to FIG. 3A and FIG. 3B, according to an embodiment, a first electrical path 311 (shown by a thick, dark line) of the first contact structure 121 may include a path passing through the first bending portion 121*a*, the second bending portion 121*b*, and the third bending portion 121*c* in sequence when the first header 150 is not drawn in the first accommodation groove 111 (e.g., is disconnected from the connector 100).

According to an embodiment, as the first header 150 is drawn in the first accommodation groove 111 to be connected to the connector 100 at the opposing contacts, the first bending portion 121*a* of the first contact structure 121 may come into contact with the first header 150 at a first point 211 of the first bending portion 121*a*. In an embodiment, as the first bending portion 121*a* is bent, a second point 212 and a third point 213 of the first bending portion 121*a* may come into contact with each other along a lateral direction (see, FIG. 3B), whereas these two points were spaced apart from each other along the lateral direction without the first header 150 inserted into the connector 100 (see, FIG. 3A). Similarly, a fourth point 214 of the first bending portion 121*a* and a fifth point 215 of the third bending portion 121*c* which were spaced apart along the lateral direction (see, FIG. 3A) may come into contact with each other along the lateral direction (see, FIG. 3B). Likewise, as the second bending portion 121*b* is bent, a seventh point 217 of the third bending portion 121*c* which were spaced apart along the lateral direction may come into contact with a sixth point 216 of the second bending portion 121*b* with the first header 150 inserted into the connector 100.

A total length occupied by a respective contact along the x direction may be maximum in a connector 100 which is unconnected to the first header 150 (FIG. 3A). A total length occupied by the respective contact along the x direction may be minimum in the connector 100 which is connected to the first header 150 (FIG. 3B). That is, compression of the respective contact decreases the overall planar length together with increasing the contact points within the respective contact, while expansion increases the overall planar length together with decreasing the number of contact points within the respective contact.

According to an embodiment, as the first bending portion 121*a* and the third bending portion 121*c* come into electrical contact with each other and the second bending portion 121*b* and the third bending portion 121*c* come into electrical contact with each other, the first contact structure 121 may have or define a second electrical path 312. According to an embodiment, the second electrical path 312 may have a smaller total electrical length than that of the first electrical path 311.

According to an embodiment, the connector 100 may transmit a signal to the first header 150 or may receive a signal from the first header 150 through the second electrical path 312. For example, the connector 100 may reduce a signal loss or an electrical loss caused by an electrical length by using the second electrical path 312, compared to a case in which the connector 100 transmits a signal to the first header 150 or receives a signal from the first header 150 through the first electrical path 311. In addition, the connector 100 may increase a transmission and/or reception speed of a signal by using the second electrical path 312 having the smaller electrical length.

According to an embodiment, as the first header 150 is drawn in the first accommodation groove 111, the first bending portion 121*a*, the second bending portion 121*b*, and/or the third bending portion 121*c* of the first contact structure 121 may be bent. For example, the first contact structure 121 may apply a pressure to the first header 150 drawn in the first accommodation groove 111 in a first direction (for example, a +x direction) due to an elastic force of the respective contact. Likewise, the second contact structure 122 may apply a pressure to the first header 150 drawn in the first accommodation groove 111 in a second direction (for example, −x direction) due to an elastic force.

According to an embodiment, the first header 150 drawn in the first accommodation groove 111 may be fixed by the pressure applied by the first contact structure 121 and the second contact structure 122. For example, if no pressure is applied to the inserted header by the first contact structure 121 and the second contact structure 122, when an external physical impact is applied to the connector 100 or there is a shake, the first accommodation groove 111 of the connector 100 and the inserted header may be decoupled from each other or an electrical connection therebetween may be blocked in part. On the other hand, when there is a pressure applied by the first contact structure 121 and the second contact structure 122 according to an embodiment, the first accommodation groove 111 of the connector 100 and the first header 150 may not be decoupled from each other and an electrical connection therebetween may be maintained in spite of an external physical impact.

According to an embodiment, as the first header 150 is drawn in the first accommodation groove 111, the first bending portion 121*a* of the first contact structure 121 may be bent such as to reduce a radius of curvature thereof, and the first contact structure 121 may come into contact with the first header 150 under a surface formed by the guide structure 130 (for example, the first guide 131 or the second guide 132). In an embodiment, the housing 110 further includes a bottom surface with forms the groove together with the inner side surface, and the insertion of the header connector into the groove further includes the first point of the first bent portion and the second point of the second bent portion both closer to the bottom surface of the housing than the first guide and the second guide (refer to FIGS. 3A and 3B, for example).

In another example, as the first header 150 is drawn in the first accommodation groove 111, the fourth bending portion 122*a* of the second contact structure 122 may be bent such as to reduce a radius of curvature thereof, and the second contact structure 122 may come into contact with the first header 150 under a surface formed by the guide structure 130 (for example, the third guide structure 133 or the fourth guide structure 134). As being "under a surface" formed by the respective guide surface, the various contact points may be closer to a lower end of the first accommodation groove 111 than the respective guide surface (for example, 131, 132, 133 or 134) adjacent to the respective contact.

Figure 4A:
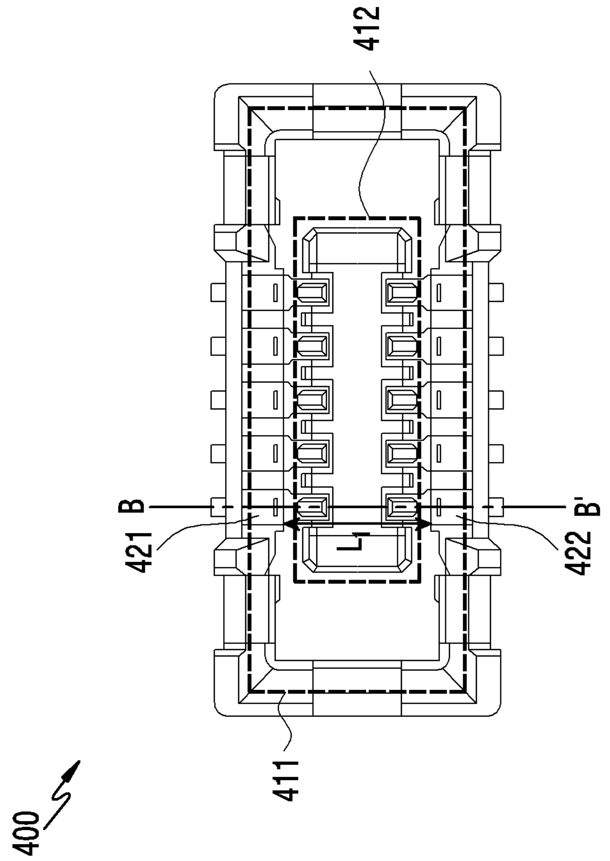
FIGS. 4A and 4B are respectively a top plan view and a cross-sectional view taken along line B-B' in FIG. 4A illustrating a connector of a second contact point structure.
Figure 4B:
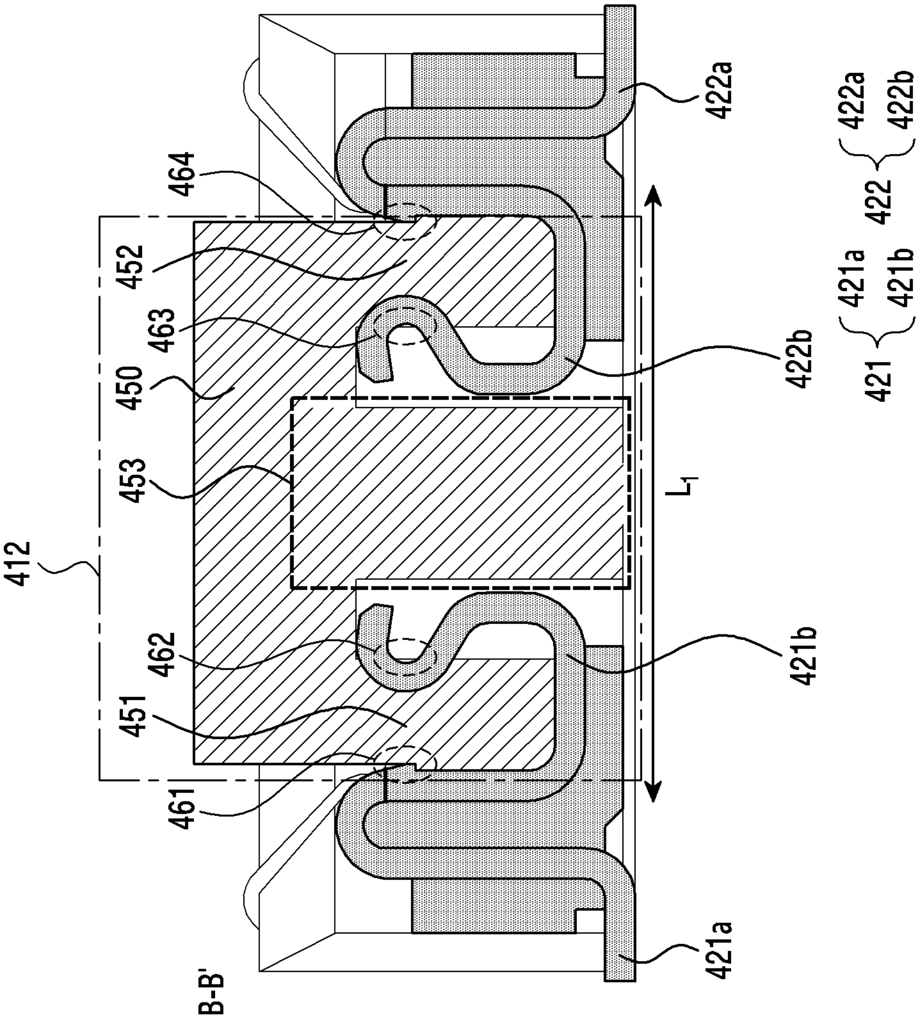

FIGS. 4A and 4B are respectively a top plan view and a cross-sectional view taken along line B-B' in FIG. 4A illustrating a second contact point structure of a connector 400.

Referring to FIG. 4A, the connector 400 of the second contact point structure may include or define a groove such as a second accommodation groove 411.

The connector 400 of the second contact point structure may include at least one contact structure. The connector 400 of the second contact point structure may include a third contact structure 421 disposed in and exposed to outside the connector 400 at the second accommodation groove 411, and may include a fourth contact structure 422 disposed in and exposed to outside the connector 400 at the second accommodation groove 411 at a position of the second accommodation groove 411 opposite to the position of the third contact structure 421.

The third contact structure 421 may include a first portion 421*a* and a second portion 421*b* as length portions connected to each other. In an embodiment, the fourth contact structure 422 may include a third portion 422*a* and a fourth portion 422*b* as length portions connected to each other. The various portions within a contact structure may form a single unit or unitary conductive member.

The second accommodation groove 411 may include a first space 412 (e.g., a first space portion or first volume portion). The first space 412 may include the second portion 421*b* of the third contact structure 421, the fourth portion 422*b* of the fourth contact structure 422, and a space or gap between the second portion 421*b* and the fourth portion 422*b*. In a plan view, the first space 412 is spaced apart from the inner sidewalls of the housing which define the second accommodation groove 411.

A planar dimension (e.g., a width, a length, etc.) of the first space 412 may be defined along a plane, such as along the x direction or the y direction, without being limited thereto. A width of the first space 412 may have a first length L1.

A second header 450 may include a first signal terminal 451, a second signal terminal 452, and/or a securing portion 453. When the second header 450 is drawn in the second accommodation groove 411, the first signal terminal 451 may come into contact with the second portion 421*b* of the third contact structure 421 at two points of contact. For example, the first signal terminal 451 may come into contact with the third contact structure 421 at a first point 461 (e.g., a first point of contact) and a second point 462 (e.g., a second point of contact). In addition, the second signal terminal 452 may come into contact with the fourth portion 422*b* of the fourth contact structure 422 at two points of contact. For example, the second signal terminal 452 may come into contact with the fourth contact structure 422 at a third point 463 and a fourth point 464. As being "in contact," elements may form an interface therebetween, such as to form a physical and electrical connection with each other.

The second portion 421*b* may fix the first signal terminal 451 relative to the second accommodation groove 411. For example, when the second header 450 is drawn in the second accommodation groove 411, the second portion 421*b* may come into contact with the first signal terminal 451 at two points, thereby enclosing the first signal terminal 451. In this case, when a shake or an external force is applied to the connector 400 of the second contact point structure, the second portion 421*b* may maintain an electrical contact with the first signal terminal 451, and simultaneously, may fix the second header 450 within the second accommodation groove 411 to prevent the second header 450 from being undesirably released from the second accommodation groove 411.

The fourth portion 422*b* may fix the second signal terminal 452 relative to the second accommodation groove 411. For example, when the second header 450 is drawn in the second accommodation groove 411, the fourth portion 422*b* may come into contact with the second signal terminal 452 at two points, thereby enclosing the second signal terminal 452. In this case, when a shake or an external force is applied to the connector 400 of the second contact point structure, the fourth portion 422*b* may maintain an electrical contact with the second signal terminal 452, and simultaneously, may fix the second header 450 to the second accommodation groove 411 to prevent the second header 450 from being released from the second accommodation groove 411.

The securing portion 453 of the second header 450 may be disposed between the third contact structure 421 and the fourth contact structure 422. When a shake or an external force is applied to the connector 400 of the second contact point structure, the securing portion 453 may fix the second header 450 relative to the second accommodation groove 411 to prevent the second header 450 from being released from the second accommodation groove 411.

The connector 400 of the second contact point structure illustrated in FIG. 4 which includes the first space 412 having the width of the first length L1 in order to fix or couple the second header 450, provides difficulty in miniaturizing the connector 400 of the second contact point structure due to the presence of the first space 412. Accordingly, hereinbelow, a connector of a first contact point structure having a narrower width than the connector 400 of the second contact point structure will be described with reference to FIG. 5A.

Figure 5A:
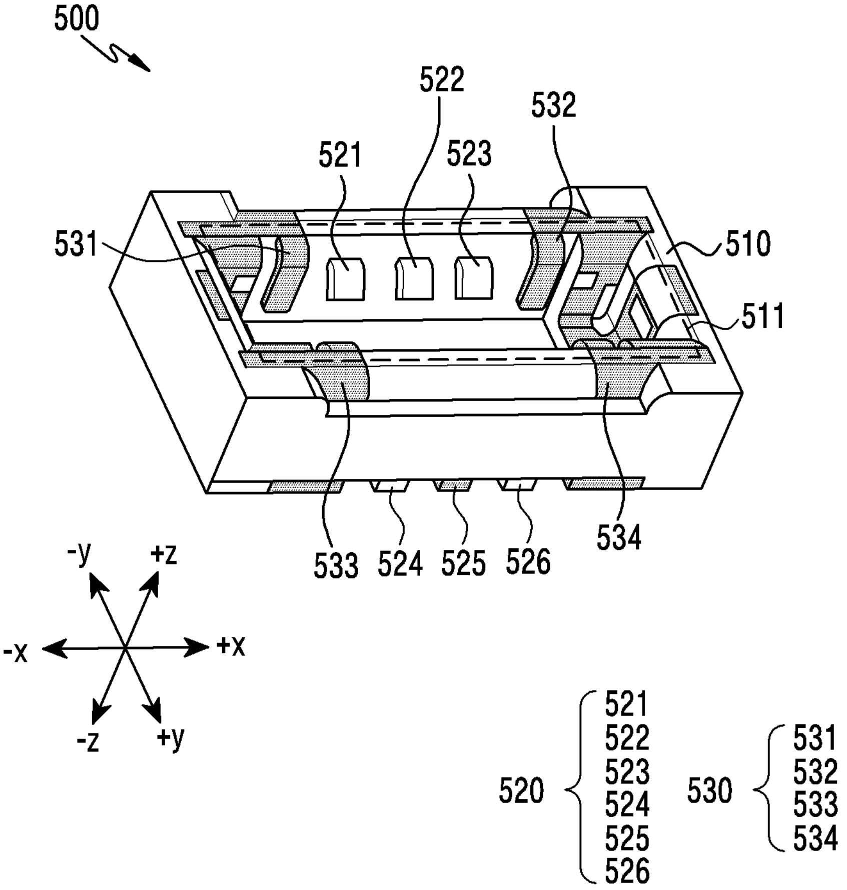
FIG. 5A is a perspective view illustrating a connector of a first contact point structure according to an embodiment.

FIG. 5A is a perspective view illustrating the connector 500 of the first contact point structure.

Figure 5B:
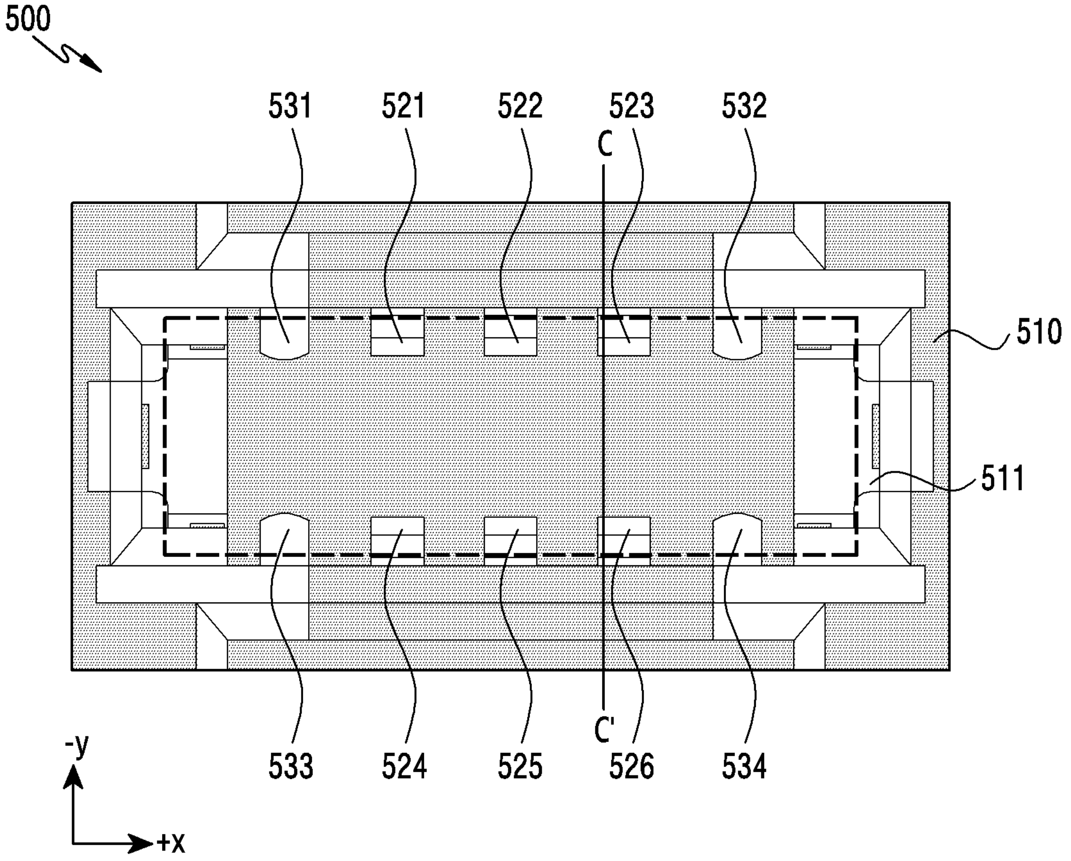
FIG. 5B is a top plan view of the connector of the first contact point structure as viewed in a −z direction.

FIG. 5B is a top plan view of the connector 500 of the first contact point structure as viewed in a −z direction.

Figure 5C:
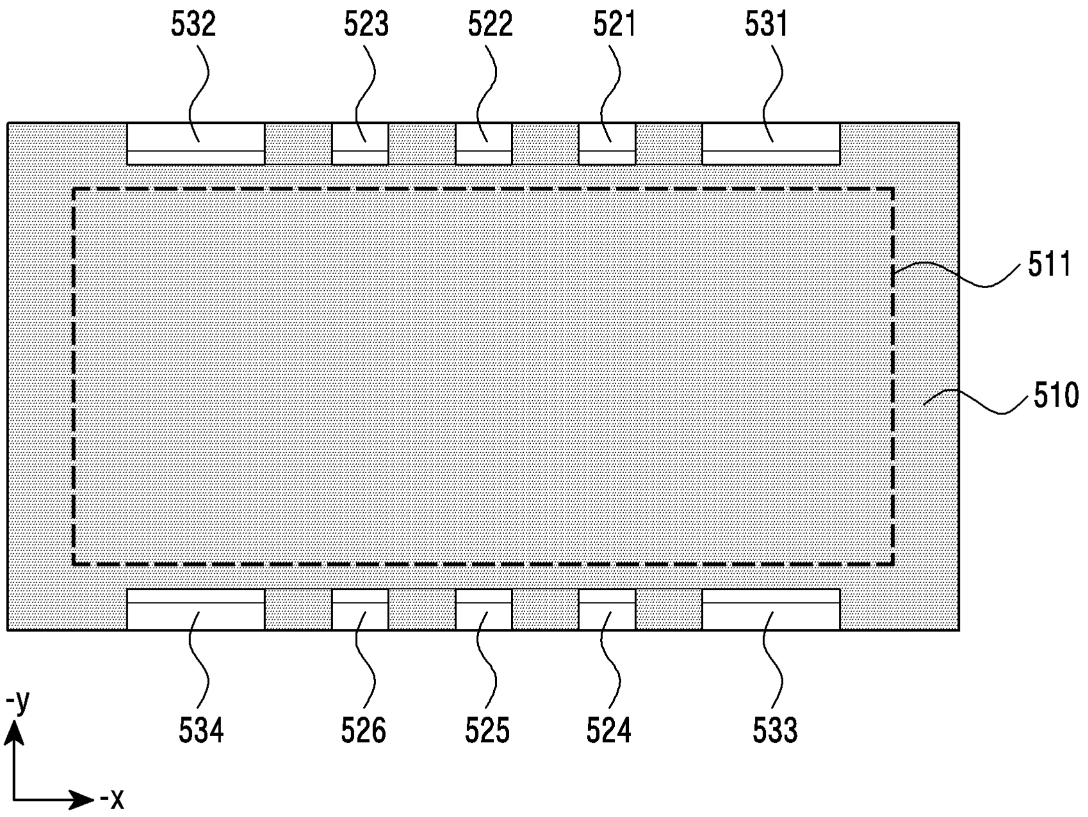
FIG. 5C is a bottom plan view of the connector of the first contact point structure as viewed in a +z direction.

FIG. 5C is a bottom plan view of the connector 500 of the first contact point structure as viewed in a +z direction.

Figure 5D:
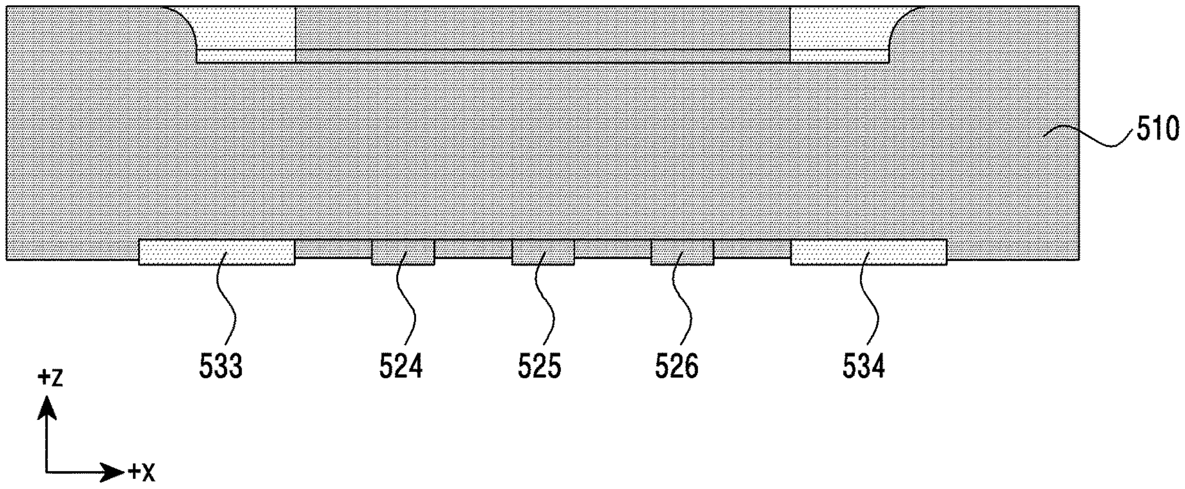
FIG. 5D is a cross-sectional view of the connector of the first contact point structure as viewed in a −y direction.

FIG. 5D is a cross-sectional view of the connector 500 of the first contact point structure as viewed in a −y direction.

Figure 5E:
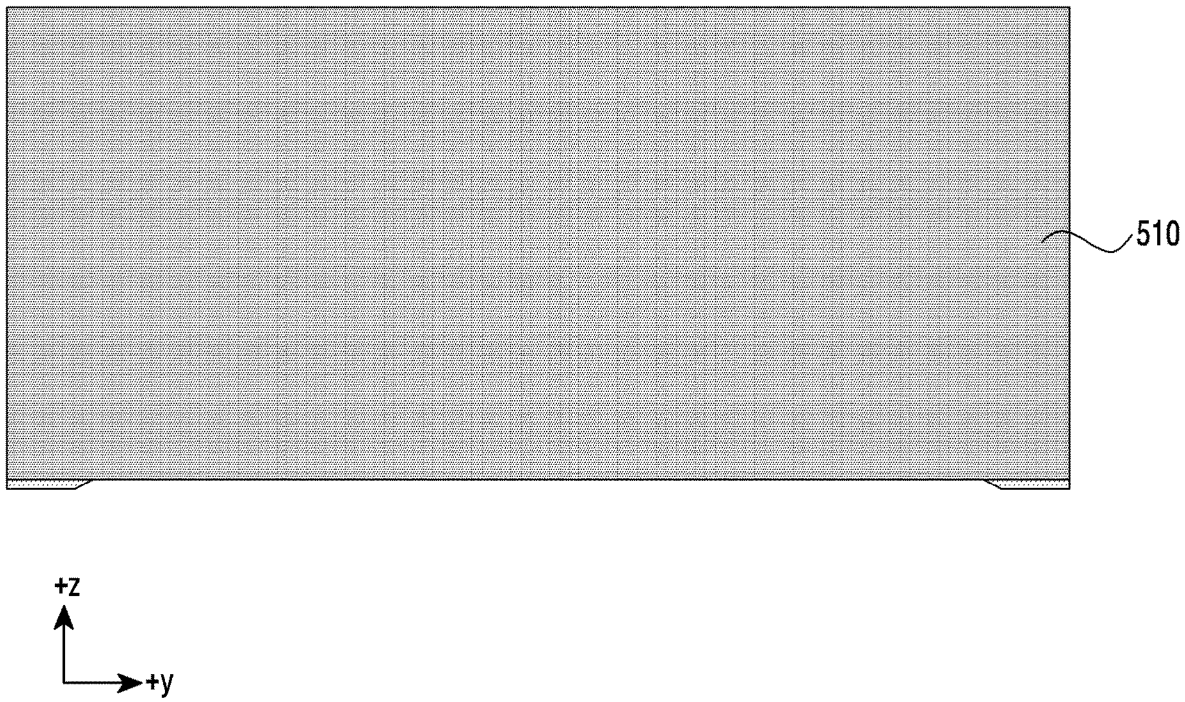
FIG. 5E is a cross-sectional view of the connector of the first contact point structure as viewed in a +x direction.

FIG. 5E is a cross-sectional view of the connector 500 of the first contact point structure as viewed in a +x direction.

Referring to FIGS. 5A, 5B, 5C, 5D, and 5E, the connector 500 of the first contact point structure according to an embodiment may include a housing 510, a contact structure 520, and a guide structure 530. In an embodiment, the contact structure 520 may include a first contact structure 521, a second contact structure 522, a third contact structure 523, a fourth contact structure 524, a fifth contact structure 525, and/or a sixth contact structure 526. In an embodiment, the guide structure 530 may include a first guide 531, a second guide 532, a third guide 533, and/or a fourth guide 534.

According to an embodiment, the first contact structure 521, the second contact structure 522, and the third contact structure 523 may be disposed or formed on one side surface (e.g., a same side surface) of a third accommodation groove 511. In an embodiment, the fourth contact structure 524 may be disposed or formed on the other side surface of the third accommodation groove 511 that is opposite to the first contact structure 521. The fifth contact structure 525 may be disposed or formed on the other side surface of the third accommodation groove 511 that is opposite to the second contact structure 522. The sixth contact structure 526 may be disposed or formed on the other side surface of the third accommodation groove 511 that is opposite to the third contact structure 523.

According to an embodiment, the first guide 531 and the second guide 532 may be disposed or formed on one side surface (e.g., a same side surface) of the third accommodation groove 511, together with the first contact structure 521, the second contact structure 522, and the third contact structure 523 being disposed therebetween. According to an embodiment, the third guide 533 and the fourth guide 534 may be disposed or formed on the other side surface of the third accommodation groove 511, together with the fourth contact structure 524, the fifth contact structure 525, and the sixth contact structure 526 being disposed therebetween.

Referring to FIGS. 5A and 5B, each of the contact structures and guides described above may protrude into the third accommodation groove 511, from an inner sidewall of the housing 510. The header which is inserted into the connector 500 may have an outer shape or profile which corresponds to the inner shape or profile of the housing 510 at the third accommodation groove 511, without being limited thereto or thereby. The contact structures and guides described above may also protrude from a bottom surface of the housing 510.

Figure 5F:
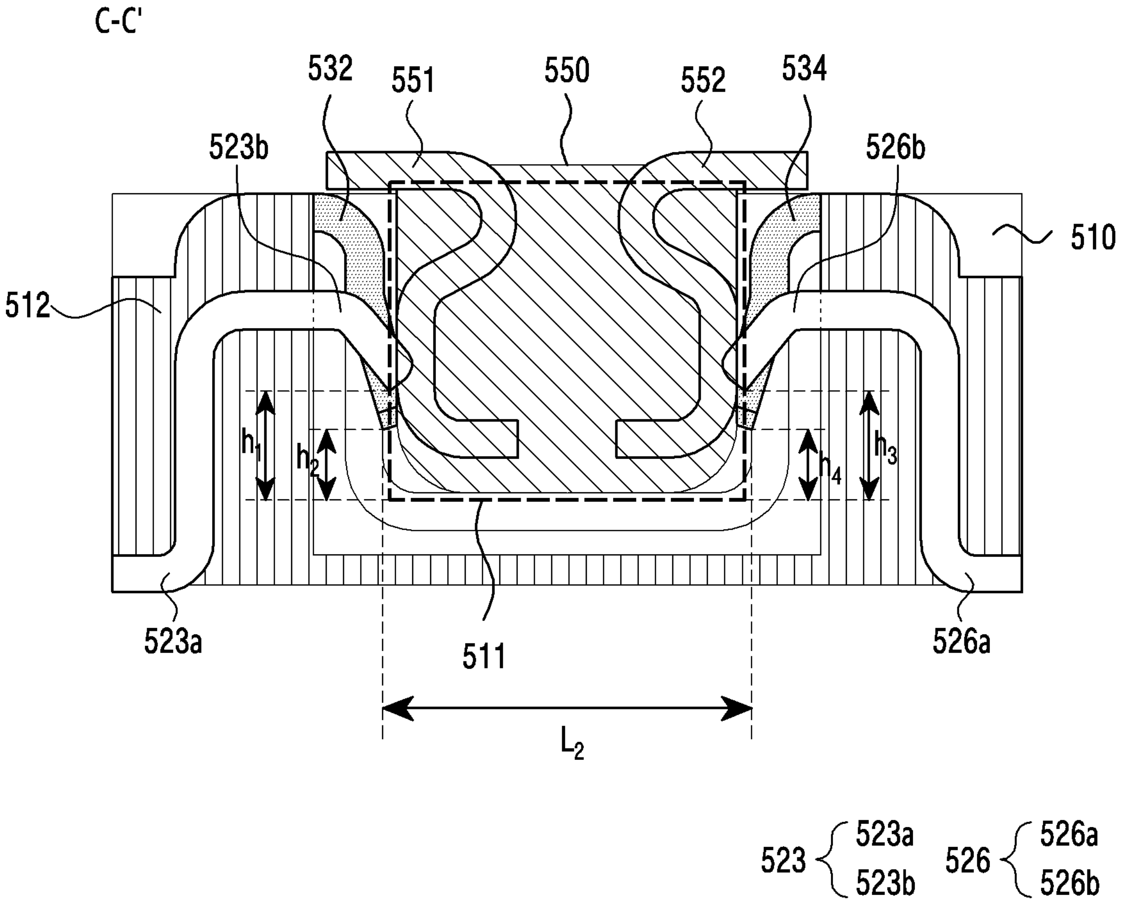
FIG. 5F is a cross-sectional view taken along line C-C' of FIG. 5A and illustrating the connector of the first contact point structure as viewed in the +x direction.

According to an embodiment, when a third header 550, which will be described below with reference to FIG. 5F, is drawn in the third accommodation groove 511, the guide structure 530 may come into contact with the third header 550 and may guide the position of the third header 550. In an embodiment, the guide structure 530 may guide the position of the third header 550 to prevent the contact structure 520 from undergoing plastic deformation. For example, when the third header 550 is drawn in the third accommodation groove 511 in a misalignment state, the contact structure 520 may undergo plastic deformation due to a pressure applied by the misaligned third header 550 if there is no guide structure 530. On the other hand, if there is the guide structure 530 according to an embodiment, the misaligned third header 550 may be prevented from being drawn in the third accommodation groove 511 by more than a designated depth, and accordingly, the contact structure 520 may be prevented from undergoing plastic deformation by a pressured applied by the misaligned third header 550.

According to an embodiment, the guide structure 530 may be formed with a conductive material (for example, metal), and the guide structure 530 may correspond to a power terminal of the connector 500 of the first contact point structure.

According to an embodiment, the contact structure 520 may be manufactured or provided by a method different from that of the contact structure 120 shown in FIG. 1A. For example, the contact structure 520 may have at least a part within a molded portion provided by an insert-molding method. In an example, a portion of the contact structure 520 that is formed in a molding and a protruding portion that is formed outside the molding may be distinguished from each other, which will be described in FIG. 5F.

According to an embodiment, the explanation of the connector 100 illustrated in FIG. 1 may be applied to the connector 500 of the first contact point structure shown in FIG. 5A. Likewise, the explanation of the connector 500 of the first contact point structure of FIG. 5A may be applied to the connector 100 illustrated in FIG. 1.

FIG. 5F is a cross-sectional view taken on line C-C' of FIG. 5A and illustrating the connector 500 of the first contact point structure as viewed in the +x direction. The molding 512 may define the inner side surface and the groove of the housing 510.

Referring to FIG. 5F, according to an embodiment, the contact structure 520 formed by the insert-molding method may be divided into a portion that is formed within a molding 512 and a protruding portion that is formed extended from the inside of the molding 512 to outside the molding 512. The molding 512 as a molded member may be considered a part of the housing 510, without being limited thereto. In an embodiment, the contact penetrates the molding 512 of the housing 510 and includes a first portion in the molding 512 of the housing and a second portion protruding out of the molding 512 and into the groove. For example, the third contact structure 523 may include a first internal portion 523*a* that is formed inside the molding 512 and a first protruding portion 523*b* that is formed outside the molding 512 to protrude therefrom. In another example, the sixth contact structure 526 may include a second internal portion 526*a* that is formed inside the molding 512 and a second protruding portion 526*b* that is formed outside the molding 512 to protrude therefrom. In an embodiment, a protruding portion (for example, the first protruding portion 523*b* or the second protruding portion 526*b*) that is formed outside the molding 512 in the contact structure 520 may be bent or have a bend defined therein.

According to an embodiment, as the third header 550 is drawn in the third accommodation groove 511, the protruding portion formed outside the molding 512 in the contact structure 520 may be bent. Accordingly, the contact structure 520 which is bent or compressed may apply a pressure to the third header 550 drawn in the third accommodation groove 511, at an outer surface of the third header 550, due to an elastic force of the respective contact as described in FIG. 3.

According to an embodiment, the third header 550 may be fixed to the third accommodation groove 511 by the pressure applied to the third header 550 by the contact structure 520. The connector 500 of the first contact point structure may not include the first space 412 (e.g., may exclude the first space 412 of FIGS. 4A and 4B) for fixing the second header 450 to the second accommodation groove 411, which is different from the connector 400 of the second contact point structure shown in FIG. 4. In an embodiment, the first space 412 for fixing the third header 550 may refer to the second portion 421*b*, the fourth portion 422*b*, and the space between the second portion 421*b* and the fourth portion 422*b*.

According to an embodiment, since the connector 500 of the first contact point structure does not include the first space 412 of the connector 400 of the second contact point structure, the connector 500 of the first contact point structure may be miniaturized compared to the connector 400 of the second contact point structure.

According to an embodiment, the third accommodation groove 511 may have a planar dimension such as a width of a second length L2 or greater in order to guarantee a spacing distance between the contact structures 520. That is, a gap between the contact structures 520 may have the second length L2. The second length L2 which is the width of the third accommodation groove 511 in a direction between facing contacts, may be smaller than the first length L1 which is the width of the first space 412 in a direction between facing contacts. Accordingly, the connector 500 of the first contact point structure may have a width smaller than that of the connector 400 of the second contact point structure.

According to an embodiment, a contact point of the contact structure 520 may have a different vertical height from a bottom surface of the housing 510 which defines the third accommodation groove 511, relative to a contact point of the guide structure 530 corresponding to a power terminal. In an embodiment, the contact structure 520 and the guide structure 530 may have different vertical heights along the thickness direction (e.g., the z direction), such that, when the third header 550 is drawn in the third accommodation groove 511 in an misalignment state, the contact structure 520 is prevented from being damaged since the power terminal 551 and 552 of the third header 550 and the contact structure 520 are electrically connected to each other.

A contact point may be defined at (or by) a distal end of a contact or terminal, and be a location of the distal end which is closest to the bottom surface of the housing 510 which defines the third accommodation groove 511. For example, a contact point of the third contact structure 523 may have a first height h1 from the bottom surface of the housing 510 which defines the third accommodation groove 511, and the second guide 532 may have a second height h2 from the bottom surface of the housing 510 which defines the third accommodation groove 511. The contact point of the third contact structure 523 and the contact point of the second guide 532 may have a height difference (h1−h2).

Proper electrical connection includes the first power terminal 551 of the third header 550 which is inserted into the connector 500 in contact with the contact point of the second guide 532 which is at the second height h2 to be electrically connected with the second guide 532. In an example, when the third header 550 is drawn in the third accommodation groove 511, the first power terminal 551 of the third header 550 that corresponds to the second guide 532 may move adjacent to the position of the third contact structure 523 (e.g., closer to the third contact structure 523 and/or separated from the second guide 532) due to misalignment. Accordingly, in one or more embodiment, even when the third header 550 moves adjacent to the third contact structure 523 having the contact point of the first height h1 due to misalignment, the first power terminal 551 may be prevented from coming into electrical contact or being connected with an actual portion of the third contact structure 523 due to the height difference h1−h2. Accordingly, the connector 500 of the first contact point structure may prevent the first power terminal 551 and the third contact structure 523 from coming into electrical contact or being electrically connected with each other and from being damaged by a fire.

In another example, it may be assumed that the first power terminal 551 of the third header 550 corresponds to the third contact structure 523. Proper electrical connection may include the first power terminal 551 of the third header 550 in contact with the contact point of the third contact structure 523 which is at the first height h1, to be electrically connected with the third contact structure 523. In this case, when the third header 550 is drawn in the third accommodation groove 511, the third header 550 may move adjacent to the position of the second guide 532 instead of the third contact structure 523, due to misalignment. Accordingly, even when the third header 550 moves adjacent to the second guide 532 having the contact point of the second height h2 due to misalignment, the first power terminal 551 may be prevented from coming into electrical contact or being connected with the second guide 532 due to the height difference h1−h2. Accordingly, the connector 500 of the first contact point structure may prevent the first power terminal 551 and the second guide 532 from coming into electrical contact or being electrically connected with each other and from being damaged by a fire.

In another example, a contact point of the sixth contact structure 526 may have a third height h3 from the bottom surface of the third accommodation groove 511, and the fourth guide 534 may have a fourth height h4 from the bottom surface of the third accommodation groove 511. The contact point of the sixth contact structure 526 and the contact point of the fourth guide 534 may have a height difference h3−h4. In an example, when the third header 550 is drawn in the third accommodation groove, the second power terminal 552 of the third header 550 that corresponds to the fourth guide 534 may move adjacent to the position of the sixth contact structure 526 due to misalignment. The second power terminal 552 may be prevented from coming into electrical contact with the sixth contact structure 526 due to the height difference h3−h4. Accordingly, the connector 500 of the first contact point structure may prevent the second power terminal 552 and the sixth contact structure 526 from coming into electrical contact with each other and from being damaged by a fire.

Figure 6A:
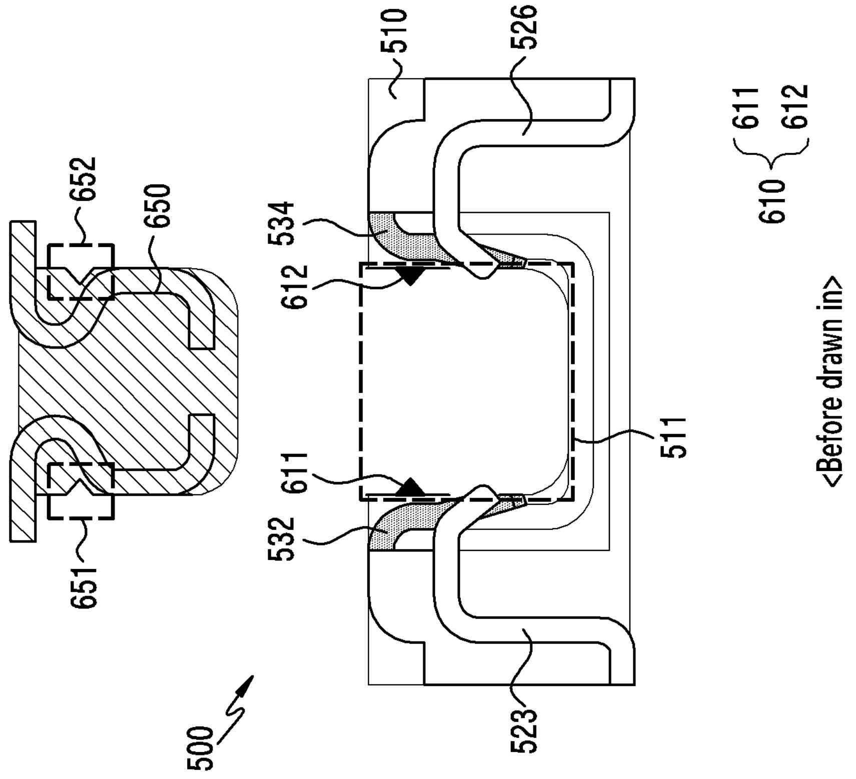
FIGS. 6A and 6B are respectively an exploded cross-sectional view and an assembled cross-sectional view illustrating a connector of a first contact point structure including a fixing member according to an embodiment.
Figure 6B:
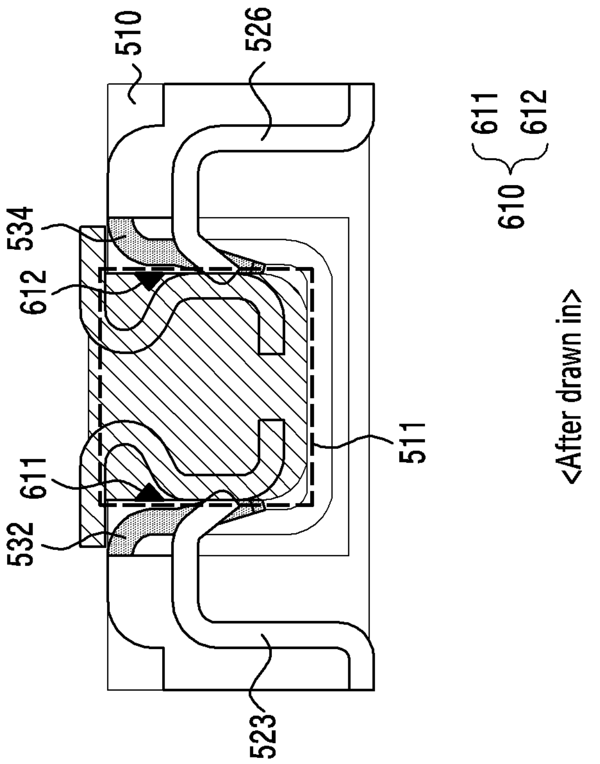

FIGS. 6A and 6B are respectively an exploded cross-sectional view and an assembled cross-sectional view illustrating a connector 500 of a first contact point structure including a fixing member 610 according to another embodiment.

Referring to FIG. 6, the connector 500 of the first contact point structure according to an embodiment may include a fixing member 610. In an embodiment, the fixing member 610 may include a first fixing member 611 and a second fixing member 612. The fixing member 610 may be extended along the inner side surface of the housing 110 and exposed to the groove (e.g., the third accommodation groove 511).

According to an embodiment, the first fixing member 611 may be coupled to or provided at one side surface of the housing 510, at the third accommodation groove 511. The second fixing member 612 may be coupled to of provided at the other side surface of the housing 510, at the third accommodation groove 511 that is opposite to the side surface of the first fixing member 611. In an embodiment, the first fixing member 611 and the second fixing member 612 may include an elastic material (for example, rubber). FIGS. 6A and 6B show a darker line at an upper portion of the third accommodation groove 511 to represent the fixing member 610, but the shape and the form are not limited thereto.

According to another embodiment, the first fixing member 611 may be coupled to a part of the second guide 532, and the second fixing member 612 may be coupled to a part of the fourth guide 534. In this case, as a fourth header 650 is drawn in the third accommodation groove 511, the first fixing member 611 may be engaged with a first coupling recess 651 and the second fixing member 612 may be engaged with a second coupling recess 652.

According to an embodiment, the first coupling recess 651 and the second coupling recess 652 may be formed or defined at an outer surface of the fourth header 650 which faces the inner sidewall of the housing 510 which defines the third accommodation groove 511.

According to an embodiment, while the fourth header 650 is drawn in the third accommodation groove 511, the first fixing member 611 and the second fixing member 612 may be contracted by a pressure of the fourth header 650. After the fourth header 650 is drawn in the third accommodation groove 511, the first fixing member 611 may be engaged with the first coupling recess 651 and the second fixing member 612 may be engaged with the second coupling recess 652. As being engaged, a portion of a respective fixing member may extend into a respective recess. For example, the first fixing member 611 and the second fixing member 612 may fix the fourth header 650 to the third accommodation groove 511 to prevent the fourth header 650 from being released from the third accommodation groove 511 by an external pressure or a shake. That is, the fixing member 610 in the groove, and the insertion of the header connector into the groove further includes the header connector contacting the fixing member 610 and being fixed to the connector 500 at the fixing member 610.

According to an embodiment, an electronic device 701 may include a connector 100 and/or a connector 500 of a first contact point structure which electrically connects a plurality of printed circuit boards in the electronic device 701, to each other. Hereinafter, the electronic device 701 including the connector 100 and/or the connector 500 of the first contact point structure will be described.

Figure 7:
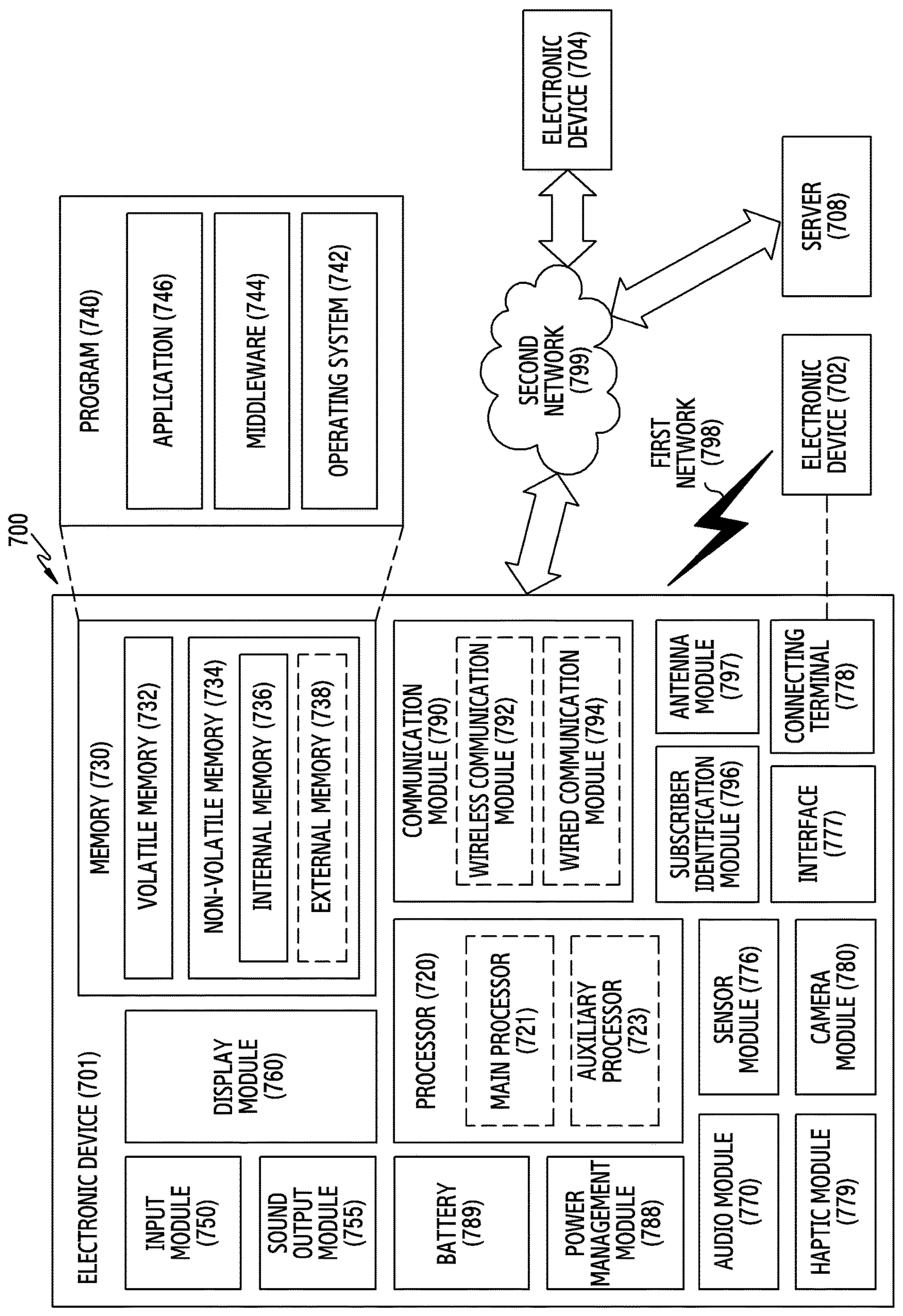
FIG. 7 is a block diagram of an electronic device in a network environment according to various embodiments.

FIG. 7 is a block diagram illustrating an electronic device 701 in a network environment 700 according to various embodiments. Referring to FIG. 7, the electronic device 701 in the network environment 700 may communicate with an electronic device 702 via a first network 798 (e.g., a short-range wireless communication network), or at least one of an electronic device 704 or a server 708 via a second network 799 (e.g., a long-range wireless communication network). According to an embodiment, the electronic device 701 may communicate with the electronic device 704 via the server 708. According to an embodiment, the electronic device 701 may include a processor 720, memory 730, an input module 750, a sound output module 755, a display module 760, an audio module 770, a sensor module 776, an interface 777, a connecting terminal 778, a haptic module 779, a camera module 780, a power management module 788, a battery 789, a communication module 790, a subscriber identification module (SIM) 796, or an antenna module 797. In some embodiments, at least one of the components (e.g., the connecting terminal 778) may be omitted from the electronic device 701, or one or more other components may be added in the electronic device 701. In some embodiments, some of the components (e.g., the sensor module 776, the camera module 780, or the antenna module 797) may be implemented as a single component (e.g., the display module 760).

The processor 720 may execute, for example, software (e.g., a program 740) to control at least one other component (e.g., a hardware or software component) of the electronic device 701 coupled with the processor 720, and may perform various data processing or computation. According to one embodiment, as at least part of the data processing or computation, the processor 720 may store a command or data received from another component (e.g., the sensor module 776 or the communication module 790) in volatile memory 732, process the command or the data stored in the volatile memory 732, and store resulting data in non-volatile memory 734. According to an embodiment, the processor 720 may include a main processor 721 (e.g., a central processing unit (CPU) or an application processor (AP)), or an auxiliary processor 723 (e.g., a graphics processing unit (GPU), a neural processing unit (NPU), an image signal processor (ISP), a sensor hub processor, or a communication processor (CP)) that is operable independently from, or in conjunction with, the main processor 721. For example, when the electronic device 701 includes the main processor 721 and the auxiliary processor 723, the auxiliary processor 723 may be adapted to consume less power than the main processor 721, or to be specific to a specified function. The auxiliary processor 723 may be implemented as separate from, or as part of the main processor 721.

The auxiliary processor 723 may control at least some of functions or states related to at least one component (e.g., the display module 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to an embodiment, the auxiliary processor 723 (e.g., an image signal processor or a communication processor) may be implemented as part of another component (e.g., the camera module 780 or the communication module 790) functionally related to the auxiliary processor 723.

According to an embodiment, the auxiliary processor 723 (e.g., the neural processing unit) may include a hardware structure specified for artificial intelligence model processing. An artificial intelligence model may be generated by machine learning. Such learning may be performed, e.g., by the electronic device 701 where the artificial intelligence is performed or via a separate server (e.g., the server 708). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input module 750 may receive a command or data to be used by another component (e.g., the processor 720) of the electronic device 701, from the outside (e.g., a user) of the electronic device 701. The input module 750 may include, for example, a microphone, a mouse, a keyboard, a key (e.g., a button), or a digital pen (e.g., a stylus pen).

The sound output module 755 may output sound signals to the outside of the electronic device 701. The sound output module 755 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 760 may visually provide information to the outside (e.g., a user) of the electronic device 701. The display module 760 may include, for example, a display, a hologram device, or a projector and control circuitry to control a corresponding one of the display, hologram device, and projector. According to an embodiment, the display module 760 may include a touch sensor adapted to detect a touch, or a pressure sensor adapted to measure the intensity of force incurred by the touch.

The audio module 770 may convert a sound into an electrical signal and vice versa. According to an embodiment, the audio module 770 may obtain the sound via the input module 750, or output the sound via the sound output module 755 or a headphone of an external electronic device (e.g., an electronic device 702) directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. According to an embodiment, the sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device (e.g., the electronic device 702) directly (e.g., wiredly) or wirelessly. According to an embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device (e.g., the electronic device 702). According to an embodiment, the connecting terminal 778 may include, for example, a HDMI connector, a USB connector, a SD card connector, or an audio connector (e.g., a headphone connector).

The haptic module 779 may convert an electrical signal into a mechanical stimulus (e.g., a vibration or a movement) or electrical stimulus which may be recognized by a user via his tactile sensation or kinesthetic sensation. According to an embodiment, the haptic module 779 may include, for example, a motor, a piezoelectric element, or an electric stimulator.

The camera module 780 may capture a still image or moving images. According to an embodiment, the camera module 780 may include one or more lenses, image sensors, image signal processors, or flashes.

The power management module 788 may manage power supplied to the electronic device 701. According to one embodiment, the power management module 788 may be implemented as at least part of, for example, a power management integrated circuit (PMIC).

The battery 789 may supply power to at least one component of the electronic device 701. According to an embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the application processor (AP)) and supports a direct (e.g., wired) communication or a wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or infrared data association (IrDA)) or the second network 799 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The wireless communication module 792 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 792 may support a high-frequency band (e.g., the mmWave band) to achieve, e.g., a high data transmission rate. The wireless communication module 792 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 792 may support various requirements specified in the electronic device 701, an external electronic device (e.g., the electronic device 704), or a network system (e.g., the second network 799). According to an embodiment, the wireless communication module 792 may support a peak data rate (e.g., about 20 gigabytes per second (Gbps) or more) for implementing eMBB, loss coverage (e.g., about 164 dB or less) for implementing mMTC, or U-plane latency (e.g., about 0.5 millisecond (ms) or less for each of downlink (DL) and uplink (UL), or a round trip of about 1 ms or less) for implementing URLLC.

The antenna module 797 may transmit or receive a signal or power to or from the outside (e.g., the external electronic device) of the electronic device 701. According to an embodiment, the antenna module 797 may include an antenna including a radiating element composed of a conductive material or a conductive pattern formed in or on a substrate (e.g., a printed circuit board (PCB)). According to an embodiment, the antenna module 797 may include a plurality of antennas (e.g., array antennas). In such a case, at least one antenna appropriate for a communication scheme used in the communication network, such as the first network 798 or the second network 799, may be selected, for example, by the communication module 790 (e.g., the wireless communication module 792) from the plurality of antennas. The signal or the power may then be transmitted or received between the communication module 790 and the external electronic device via the selected at least one antenna. According to an embodiment, another component (e.g., a radio frequency integrated circuit (RFIC)) other than the radiating element may be additionally formed as part of the antenna module 797.

According to various embodiments, the antenna module 797 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 701 and the external electronic device 704 via the server 708 coupled with the second network 799. Each of the electronic devices 702 or 704 may be a device of a same type as, or a different type, from the electronic device 701. According to an embodiment, all or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, mobile edge computing (MEC), or client-server computing technology may be used, for example. The electronic device 701 may provide ultra low-latency services using, e.g., distributed computing or mobile edge computing. In another embodiment, the external electronic device

704 may include an internet-of-things (IoT) device. The server 708 may be an intelligent server using machine learning and/or a neural network. According to an embodiment, the external electronic device 704 or the server 708 may be included in the second network 799. The electronic device 701 may be applied to intelligent services (e.g., smart home, smart city, smart car, or healthcare) based on 5G communication technology or IoT-related technology.

According to an embodiment, a connector 100 may include a housing 110 forming an exterior of the connector 100, a first accommodation groove 111 that a first header 150 being drawn in or out from, formed on a part of the connector 100 and including a side surface and a bottom surface, a guide structure 130 including a first guide 131 which is formed on a side surface of the first accommodation groove 111, and a second guide 132 which is formed on the side surface of the first accommodation groove 111 at a designated distance from the first guide 131, and a first contact structure 121 penetrating through the connector 100 to be disposed between the first guide 131 and the second guide 132, and the first contact structure 121 may include a first bending portion 121*a* and a second bending portion 121*b*, and, as the first header 150 is drawn in the first accommodation groove 111, the guide structure 130 may come into contact with the first header 150 to guide a position of the first header 150, and a first point 211 of the first bending portion 121*a* may come into contact with the first header 150, and, as the first bending portion 121*a* is bended, the first bending portion 121*a* may apply a pressure to the first header 150 in a first direction to fix the first header 150 to the connector 100, and a fourth point 214 of the first bending portion 121*a* may come into contact with a fifth point 215 of the third bending portion 121*c*.

That is, the connector includes a housing 110 including an inner side surface defining a groove which is open to outside the connector and in which a header connector is electrically connected to the connector, a contact which protrudes along a first direction from the inner side surface and into the groove and at which the header connector is electrically connected to the header connector, the contact including a first bent portion and a second bent portion arranged adjacent to each other along the first direction, and at a same side of the housing, the inner side surface of the housing defining a recess (refer to FIGS. 1A and 5A, for example) which is open to the groove, in the first direction, together with a first guide and a second guide of the housing respectively on opposing sides of the recess along the same side of the housing. The contact protrudes along the first direction from the inner side surface which is at the recess. Insertion of the header connector into the groove includes the first guide and the second guide guiding a position of the header connector along the inner side surface of the housing and into the groove, and the header connector contacting the contact at a first point of the first bent portion and bending the first bent portion, together with the first bent portion providing a pressure in the first direction to the header connector. The bending of the first bent portion includes contacting a second point of the first bent portion with a third point of the second bent portion.

According to an embodiment, the connector 100 may include a hole penetrating through an inside thereof, and the first contact structure 121 may penetrate through the connector 100 along the hole.

According to an embodiment, the first contact structure 121 may be electrically connected with a printed circuit board (PCB) disposed outside the connector.

According to an embodiment, the connector 100 may further include a second contact structure 122, and the second contact structure 122 may be disposed on the side surface of the first accommodation groove 111 that is opposite to the first contact structure 121.

According to an embodiment, as the first header 150 is drawn in the first accommodation groove 111, the second contact structure 122 may come into contact with the first header 150 and may apply a pressure to the first header 150 in a second direction which is the opposite direction of the first direction to fix the first header 150 to the connector 100.

According to an embodiment, as the first header 150 is drawn in the first accommodation groove 111, the first contact structure 121 may come into electrical contact with a first signal terminal 151 of the first header 150 to transmit and receive a first signal, and the second contact structure 122 may come into electrical contact with a second signal terminal 152 of the first header 150 to transmit and receive a second signal.

According to an embodiment, the first contact structure 121 may further include a third bending portion 121*c*, and, as the first header 150 is drawn in the first accommodation groove 111, a sixth point 216 of the second bending portion 121*b* may come into contact with a seventh point 217 of the third bending portion 121*c*.

According to an embodiment, as the first header 150 is drawn in the first accommodation groove 111, the first bending portion 121*a* of the first contact structure 121 may be bent, and the first contact structure 121 may come into contact with the first header 150 under a surface that is formed by the first guide 131 and the second guide 132.

According to an embodiment, the connector 500 may further include a fixing member 610 disposed in the third accommodation groove 511, and, as the fourth header 650 is drawn in the third accommodation groove 511, the fixing member 610 may fix the fourth header 650 to the connector 500.

According to an embodiment, the fixing member 610 may be disposed on a side surface of the third accommodation groove 511.

According to an embodiment, a connector 100 may include a housing 110 forming an exterior of the connector 100, a first accommodation groove 111 that a first header 150 is drawn in or out from, formed on a part of the connector 100 and including a side surface and a bottom surface, a guide structure 130 including a first guide 131 which is formed on a side surface of the first accommodation groove 111, and a second guide 132 which is formed on the side surface of the first accommodation groove 111 at a designated distance from the first guide 131 and a first contact structure 121 including a first portion buried in the molding and a second portion protruding from the side surface of the first accommodation groove 111, and the housing 110 may include a molding forming the first accommodation groove 111, and, as the first header 150 is drawn in the first accommodation groove 111, the guide structure 130 may come into contact with the first header 150 to guide a position of the first header 150, and the first contact structure 121 may come into contact with the first header 150 at one point and may apply a pressure to the first header 150 in a first direction to fix the first header 150 to the connector 100.

According to an embodiment, the first contact structure 121 may be electrically connected with a printed circuit board (PCB) disposed outside the connector.

According to an embodiment, as the first header 150 is drawn in the first accommodation groove 111, the second portion of the first contact structure 121 may be bent to come into contact with the first header 150.

According to an embodiment, the second portion of the first contact structure 121 which is bended may come into contact with the first header 150 under a surface formed by the first guide 131 and the second guide 132.

According to an embodiment, the connector 100 may further include a second contact structure 122, and the second contact structure 122 may be disposed on the side surface of the first accommodation groove 111 that is opposite to the first contact structure 121.

According to an embodiment, as the first header 150 is drawn in the first accommodation groove 111, the second contact structure 122 may come into contact with the first header 150 and may apply a pressure to the first header 150 in a second direction which is the opposite direction of the first direction to fix the first header 150.

According to an embodiment, as the first header 150 is drawn in the first accommodation groove 111, the first contact structure 121 may come into electrical contact with the first signal terminal 151 of the first header 150 to transmit and receive the first signal, and the second contact structure 122 may come into electrical contact with the second signal terminal 152 of the first header 150 to transmit and receive the second signal.

According to an embodiment, the connector 500 may further include a second contact structure 522 and a third contact structure 523, and the first contact structure 521, the second contact structure 522 and the third contact structure 523 may all be disposed between the first guide 531 and the second guide 532.

According to an embodiment, the connector 500 may further include a fixing member 610 disposed in the third accommodation groove 511, and, as the fourth header 650 is drawn in the third accommodation groove 511, the fixing member 610 may fix the fourth header 650 to the connector 500.

According to an embodiment, the fixing member 610 may be disposed on a side surface of the third accommodation groove 511.

According to an embodiment, a connector 100 includes a housing 110 defining an inner side surface defining a groove which is open to outside the connector 100 and in which a header connector is electrically connected to the connector 100, a contact (121 or 122) which extends through the housing 110 along a first direction to define a first end which is exposed at the groove and at which the connector 100 is electrically connected to the header connector, a second end which is opposite to the first end and exposed to outside the connector 100, and an electrical path of the contact which extends from the first end to the second end of the contact along a length of the contact. The header connector which is in the groove and electrically connected to the connector at the groove (FIG. 3B, for example) defines a first electrical path of the contact, and the header connector which is out of the groove of the connector (FIG. 3A, for example) defines a second electrical path this is longer than the first electrical path.

According to an embodiment, the contact includes a first bent portion and a second bent portion arranged adjacent to each other along the first direction. The header connector which is in the groove and electrically connected to the connector at the groove (FIG. 3B, for example) further defines a first contact point at which the header connector contacts the first bent portion and a second point of contact at which the first bent portion contacts the second bent portion, together with the first bent portion providing a pressure in the first direction to the header connector.

According to an embodiment, the contact protrudes in the first direction from the inner side surface and into the groove to define the first bent portion and the second bent portion between the inner side surface and the groove (FIG. 3B, for example).

According to an embodiment, at a same side of the housing 110, the inner side surface of the housing 110 defines a recess which is open to the groove, in the first direction, together with a first guide 131 and a second guide 132 of the housing 110 respectively on opposing sides of the recess along the same side of the housing 110 (FIGS. 1A and 5A, for example). The inner side surface at the recess is further from the groove than the inner side surface at both the first guide 131 and the second guide 132. The contact (e.g., 121 in FIG. 1A) protrudes in the first direction from the inner side surface of the housing which is at the recess.

In an embodiment, the connector 100 is electrically connected to a first circuit board, the first circuit board being outside of the connector, the header connector is electrically connected to a second circuit board, the second circuit board being outside of the connector 100, and the header connector which is in the groove and electrically connected to the connector 100 at the groove electrically connects the first circuit board to the second circuit board.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

It is to be understood that a singular form of a noun corresponding to an item may include one or more of the things, unless the relevant context clearly indicates otherwise. Within the Figures and the text of the disclosure, a reference number indicating a singular form of an element may also be used to reference a plurality of the singular element. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order).

It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

It will be understood that when an element is referred to as being related to another element such as being "on" another element, it can be directly on the other element or intervening elements may be present therebetween. In contrast, when an element is referred to as being related to another element such as being "directly on" another element, there are no intervening elements present.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 740) including one or more instructions that are stored in a storage medium (e.g., internal memory 736 or external memory 738) that is readable by a machine (e.g., the electronic device 701). For example, a processor (e.g., the processor 720) of the machine (e.g., the electronic device 701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Where, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A connector comprising:

a housing forming an exterior of the connector;

an accommodation groove comprising a side surface and a bottom surface, wherein a header connector is drawn in or out from the accommodation groove;

a guide comprising a first guide which is formed on the side surface of the accommodation groove, and a second guide which is formed on the side surface of the accommodation groove; and a first contact penetrating through the connector to be disposed between the first guide and the second guide, wherein the first contact comprises a first bending portion and a second bending portion, and wherein, when the header connector is drawn in the accommodation groove such that the first bending portion is bent, the guide comes into contact with the header connector to guide a position of the header connector, a first point of the first bending portion comes into contact with the header connector, the first bending portion applies a pressure to the header connector in a first direction to fix the header connector to the connector, and a second point of the first bending portion comes into contact with a third point of the second bending portion.

2. The connector of claim 1, wherein the connector comprises a hole penetrating through the connector, and wherein the first contact penetrates through the connector along the hole.

3. The connector of claim 1, wherein the first contact is electrically connected with a printed circuit board (PCB) disposed outside the connector.

4. The connector of claim 1, further comprising a second contact, wherein the second contact is disposed on the side surface of the accommodation groove and disposed to be opposite to the first contact.

5. The connector of claim 4, wherein, as the header connector is drawn in the accommodation groove, the second contact comes into contact with the header connector and applies a pressure to the header connector in a second direction which is an opposite direction of the first direction to fix the header connector to the connector.

6. The connector of claim 4, wherein, as the header connector is drawn in the accommodation groove, the first contact is electrically connected with a first signal terminal of the header connector to transmit and/or receive a first signal, and the second contact is electrically connected with a second signal terminal of the header connector to transmit and/or receive a second signal.

7. The connector of claim 1, wherein the first contact further comprises a third bending portion, and wherein, as the header connector is drawn in the accommodation groove, a fourth point of the second bending portion comes into contact with a fifth point of the third bending portion.

8. The connector of claim 1, wherein, as the header connector is drawn in the accommodation groove, the first bending portion of the first contact is bent, and the first contact comes into contact with the header connector under a surface formed by the first guide and the second guide.

9. The connector of claim 1, further comprising a fixing member disposed in the accommodation groove, wherein, as the header connector is drawn in the accommodation groove, the fixing member fixes the header connector to the connector.

10. The connector of claim 9, wherein the fixing member is disposed on the side surface of the accommodation groove.

11. The connector of claim 9, wherein the fixing member is formed with rubber.

12. The connector of claim 1, wherein the housing comprises a molding forming the accommodation groove.

13. The connector of claim 12, wherein the first contact comprises:

a first portion buried in the molding of the housing; and a second portion protruding from the side surface of the accommodation groove.

14. The connector of claim 1, wherein the guide is formed with a conductive material.

15. The connector of claim 1, wherein, as the header connector is drawn in the accommodation groove, the guide is electrically connected with a first terminal of the header connector to transmit and/or receive a first signal.

16. A connector comprising:

a housing, wherein a groove for an electrical connection with a header connector is formed in the housing and the groove includes a side surface and a bottom surface; and a conductive structure including:

a first bending portion disposed at the side surface of the groove for contacting the header connector, and a second bending portion connected with the first bending portion, wherein, in case that the header connector is entered into the groove and in contact with the first bending portion, the first bending portion is bent such that an end of the conductive structure is in contact with a first point of the conductive structure and such that a portion of an electrical path is formed from the end of the conductive structure to the first point.

17. A connector comprising:

a housing comprising an inner side surface defining a groove which is open to outside the connector and in which a header connector is electrically connected to the connector;

a contact which protrudes along a first direction from the inner side surface and into the groove and at which the header connector is electrically connected to the header connector, the contact comprising a first bent portion and a second bent portion arranged adjacent to each other along the first direction; and at a same side of the housing, the inner side surface of the housing defining a recess which is open to the groove, in the first direction, together with a first guide and a second guide of the housing respectively on opposing sides of the recess along the same side of the housing, wherein the contact protrudes along the first direction from the inner side surface which is at the recess, and insertion of the header connector into the groove includes:

the first guide and the second guide guiding a position of the header connector along the inner side surface of the housing and into the groove, and the header connector contacting the contact at a first point of the first bent portion and bending the first bent portion, together with the first bent portion providing a pressure in the first direction to the header connector, and wherein the bending of the first bent portion includes contacting a second point of the first bent portion with a third point of the second bent portion.

18. The connector of claim 16, wherein at least a portion of the second bending portion is disposed inside the housing, wherein, in case that the header connector is entered into the groove and in contact with the first bending portion, the first bending portion and the second bending portion are bent such that a second point of the conductive structure is in contact with a third point of the conductive structure, and wherein the second point is disposed between the first point and the end of the conductive structure.

19. The connector of claim 16, further comprising:

a plurality of guide structures formed at the side surface for an alignment between the groove and the header connector, wherein the plurality of structures include a first guide structure and a second guide structure, wherein the conductive structure is disposed between the first guide structure and the second guide structure, wherein a hole penetrating the connector is formed in the connector, and wherein the conductive structure is disposed in the hole.

20. The connector of claim 16, wherein the conductive structure is electrically connected with a printed circuit board.

* * * * *